(12) United States Patent
Ohnemus et al.

(10) Patent No.: US 7,277,864 B2
(45) Date of Patent: Oct. 2, 2007

(54) SUSTAINABILITY RATINGS AND BENCHMARKING FOR LEGAL ENTITIES

(75) Inventors: Peter Ohnemus, Baar (CH); Henrik Steffensen, Walchwil (CH)

(73) Assignee: Asset4, Zug (CH)

( * ) Notice: Subject to any disclaimer, the term of this patent is extended or adjusted under 35 U.S.C. 154(b) by 135 days.

(21) Appl. No.: 10/708,441

(22) Filed: Mar. 3, 2004

(65) Prior Publication Data

US 2004/0249697 A1 Dec. 9, 2004

(51) Int. Cl.
*G06F 17/30* (2006.01)
(52) U.S. Cl. ...................................... 705/10
(58) Field of Classification Search ............... 705/10
See application file for complete search history.

(56) References Cited

U.S. PATENT DOCUMENTS

| | | | |
|---|---|---|---|
| 5,870,319 A * | 2/1999 | Thornton et al. ........... 708/160 |
| 6,012,044 A * | 1/2000 | Maggioncalda et al. .. 705/36 R |
| 2003/0018487 A1* | 1/2003 | Young et al. ................... 705/1 |
| 2003/0028527 A1* | 2/2003 | Crosby et al. ................. 707/3 |
| 2003/0046203 A1* | 3/2003 | Ichihari et al. ............... 705/35 |
| 2003/0110065 A1* | 6/2003 | Twigge-Molecey ............ 705/7 |
| 2004/0117240 A1* | 6/2004 | Ness et al. .................... 705/10 |
| 2004/0220868 A1* | 11/2004 | Dainoff et al. ................ 705/36 |
| 2005/0021389 A1* | 1/2005 | Dias et al. .................... 705/10 |
| 2005/0209905 A2* | 9/2005 | Ness et al. .................... 705/10 |

FOREIGN PATENT DOCUMENTS

AU 2002301158 A1 * 6/2003

OTHER PUBLICATIONS

O'Connor, The RioJo Dashboard of Sustainable Development Indicators, Jul. 2002 [GOOGLE].*
Hallerbach et al., A Framework for Managing a Portfolio of Socially Responsible Investments, European Journal of Operational Research, copyright 2003 [GOOGLE].*
CGSDI's Dashboard of Sustainability, as disclosed in the archived web site from [URL: http://web.archive.org/web/*/http://esl.jrg.it/envind/dashbrds.htm], archived between Mar. 10, 2001 and Feb. 13, 2003.*
"Nedbank Launches Sustainable Investment Index Fund." SAPA (South African Press Association), Aug. 7, 2002.*

* cited by examiner

*Primary Examiner*—Susanna M. Diaz
(74) *Attorney, Agent, or Firm*—Darby & Darby

(57) ABSTRACT

Computer-based rating of the sustainability of legal entities. Data is stored concerning at least non-economic factors of legal entities, and is used to compute sustainability scores for each entity's performance. Financial and economic criteria may also be stored and computed. Sustainability scores may be used to rate companies, governments, products and executives on a scale, with respect to each other, or within groups such as whole industries. In one embodiment, a subscriber is permitted to customize how scores are computed, to reflect subscriber preferences.

63 Claims, 32 Drawing Sheets

ENTER A COMMENT:

Your name: _____
email address: _____

Are you:
the party making the comment _____
or a representative? _____

Comment is about:
[SELECT CO.]

Comment: _____

(Your comment will be investigated.)

SUBSCRIBE

For better informed investment decisions and benchmarking, subscribe to learn sustainability ratings.

Subscription levels and prices
xxx   xxx
xxx   xxx
xxx   xxx

Subscribe now!

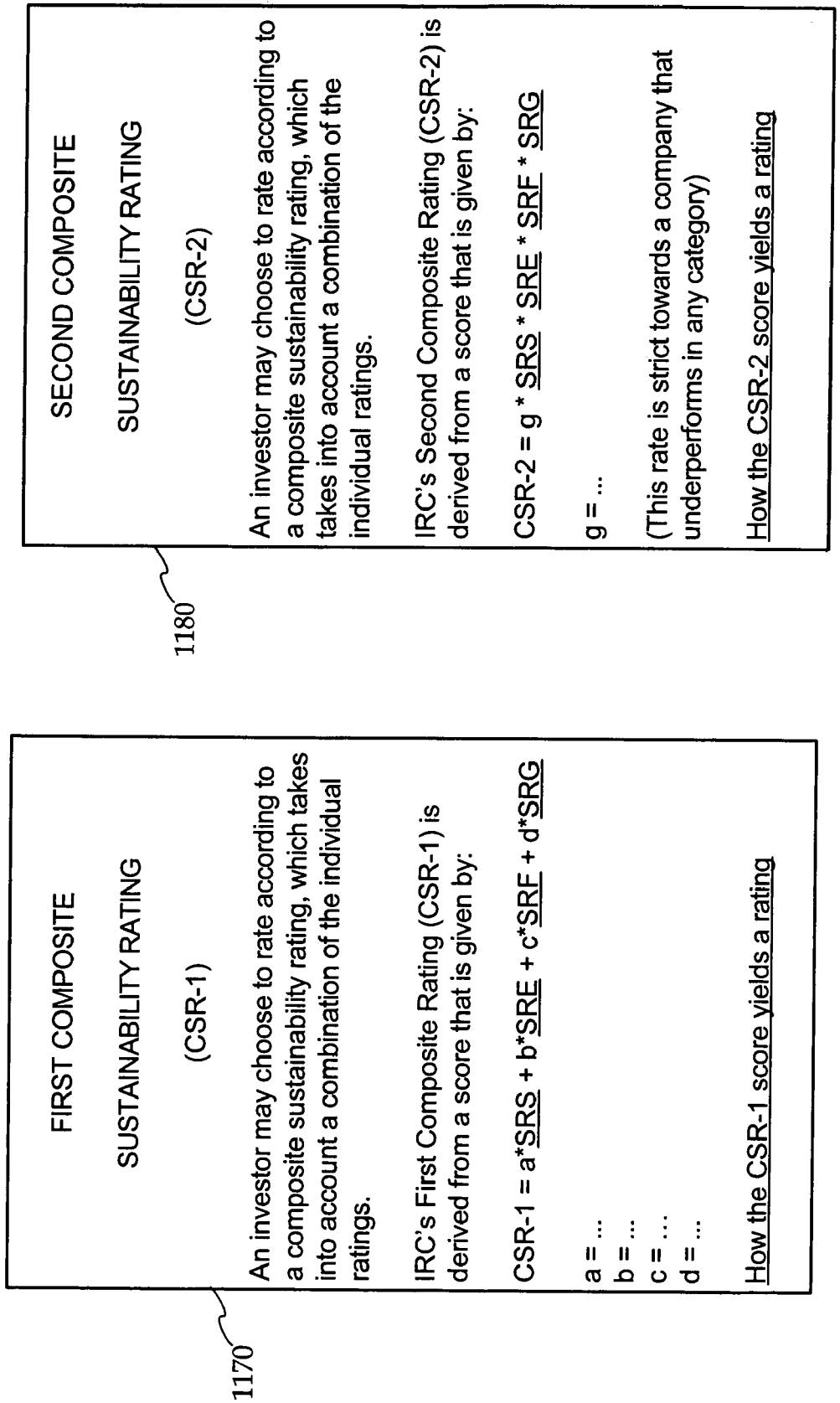

FIGURE 11G

FIRST COMPOSITE
SUSTAINABILITY RATING
(CSR-1)

An investor may choose to rate according to a composite sustainability rating, which takes into account a combination of the individual ratings.

IRC's First Composite Rating (CSR-1) is derived from a score that is given by:

CSR-1 = a*SRS + b*SRE + c*SRF + d*SRG a = ...
b = ...
c = ...
d = ...

How the CSR-1 score yields a rating

FIGURE 11H

SECOND COMPOSITE
SUSTAINABILITY RATING
(CSR-2)

An investor may choose to rate according to a composite sustainability rating, which takes into account a combination of the individual ratings.

IRC's Second Composite Rating (CSR-2) is derived from a score that is given by:

CSR-2 = g * SRS * SRE * SRF * SRG g = ...

(This rate is strict towards a company that underperforms in any category)

How the CSR-2 score yields a rating

PORTFOLIO SUSTAINABILITY RATINGS

| Investment: | Present value | MYCSR | REL. TO AGGREGATE |
|---|---|---|---|
| xxxxxxxxxx | $NNN | A | ← ABOVE |
| xxxxxxxxxx | $NNN | AA | ← ABOVE |
| xxxxxxxxxx | $NNN | A | ← ABOVE |
| xxxxxxxxxx | $NNN | B | ← BELOW ALERT: DOWNGRADED |

PORTFOLIO AGGREGATE: BBB

Print this page

What Sustainability Ratings mean

CUSTOMIZED COMPOSITE SUSTAINABILITY RATING (MYCSR)

Your custom composite Sustainability Rating (MYCSR) will be given by:

MYCSR = MYa*MYSRS + MYb*MYSRE + MYc*MYSRF + MYd*MYSRG

Edit the coefficients:

MYa = ...
MYb = ...
MYc = ...
MYd = ...

How the MYCSR score yields a rating

ON-LINE COMPANY REGISTRATION

Preliminary Questions:

Company name: _____
Trading symbol: _____ in country: _____

HQ address: _____

Company website URL: _____
Email: for correspondence from IRC: _____
Email for correspondence from the public: _____

Industry you are in: _____

Submit When the above fields are complete, an email will be sent to you with your password.

FIGURE 14B

ON-LINE INITIAL COMPANY QUESTIONNAIRE

Sustainability Questions

S1) xxxxx
S2) xxxxx
...
E1) xxxxx
E2) xxxxx
...
F1) xxxxx
F2) xxxxx
...
G1) xxxxx
G2) xxxxx
...

FIGURE 14D

SUSTAINABILITY RATINGS AND BENCHMARKING FOR LEGAL ENTITIES

FIELD OF THE INVENTION

The present invention is related to the field of rating legal entities such as corporations and governments, and more specifically to providing ratings for entities that can characterize them also in terms of their societal and environmental responsibility and impact, their economic performance, as well as their corporate governance.

BACKGROUND OF THE INVENTION

There is more to investing funds than maximizing a financial return. Companies make choices which, beyond their own financial well-being, also affect people and the environment. Investing in a company is an affirmation of all the choices it makes, an affirmation that should be made with a clear conscience. And more than dealing with one's conscience, it also makes good sense to invest in companies that are governed well and choose to minimize any adverse impact on society and the environment. Indeed, when an unexpected news story reports that a company is having such an adverse impact, its stock value may drop, wiping out wealth immediately.

Companies that take care to have good corporate governance, and also minimize any adverse societal and environmental impact, are more likely to be sustainable over the long term. As such, they represent a better investment choice. But how is an investor to make such good choices?While there exist ratings and analyses for financial returns of companies, there are no generally accepted yardsticks for comparing companies on the basis of the impact they have on society and the environment. For example, it is difficult to compare an oil company that creates useful products while causing some pollution, to a financial services company that does not pollute.

Sustainability minded investors face a further unknown when it comes to investing in instruments (bonds, etc.) of whole governments. Some governments restrict the freedoms of their people, while others pollute the environment, or accept money for receiving others' pollutants. Investors would like to know about such activities, before loaning money to such governments.

Such investors may have their own ideals, standards, or perspectives to apply to data concerning a particular company, an industry, government, or an arbitrary selection of companies such as contained in the investor's portfolio or watch list, and would be benefited by a system and method that permitted such flexibility. The present invention addresses these and other needs.

SUMMARY OF THE INVENTION

In accordance with a first aspect of the invention, there is provided a method operable in a computer-implemented rating system of the type having access to a database populated with data concerning at least one non-economic factor. The method includes the steps of providing an interface capable of displaying at least a portion of the data, enabling a user to input at least one coefficient value through the interface, computing a sustainability score using the coefficient value and the data, and outputting the sustainability score. The sustainability score utilizes the at least one non-economic factor in a formula that is viewable by the user through the interface so as to provide the user with a basis for the computed sustainability score.

In accordance with a further aspect of the invention, a computer of the type described above for implementing a rating system can be defined as comprising an interface configured to display at least a portion of the data, to enable input of at least one coefficient value, and to display a formula useful in computing a sustainability score; and a processor configured to compute the sustainability score using the formula in conjunction with any input coefficient values and the data. The interface is further configured to be capable of outputting the sustainability score.

In accordance with still a further aspect of the invention, another method that provides sustainability scores via a computer-implemented rating system comprises providing an interface which includes an audio output portion capable of conveying at least a portion of the data aurally, enabling a user to input at least one coefficient value through the interface, computing a sustainability score using the coefficient value and the data, and outputting the sustainability score. As in the prior method, the sustainability score utilizes the at least one non-economic factor in a formula that is accessible by the user through the interface, but not necessarily through the audio output portion of the interface.

In accordance with a further aspect of the invention, a computer of the type described above for implementing a rating system can be defined as comprising an interface configured to display at least a portion of the data, to enable input of at least one coefficient value, and to display a formula useful in computing a sustainability score; and a processor configured to compute the sustainability score using the formula in conjunction with any input coefficient values and the data. The interface is further configured to be capable of outputting the sustainability score.

In accordance with still a further aspect of the invention, another method that provides sustainability scores via a computer-implemented rating system comprises providing an interface which includes an audio output portion capable of conveying at least a portion of the data aurally, enabling a user to input at least one coefficient value through the interface, computing a sustainability score using the coefficient value and the data, and outputting the sustainability score. As in the prior method, the sustainability score utilizes the at least one non-economic factor in a formula that is accessible by the user through the interface, but not necessarily through the audio output portion of the interface.

These and other aspects, features, and advantages of the invention can be better understood from a review of the accompanying Drawing Figures, which form a part of this patent disclosure, and the following detailed description of certain embodiments.

BRIEF DESCRIPTION OF THE DRAWINGS

The invention will become more readily apparent from the following Detailed Description, which proceeds with reference to the accompanying drawings, in which:

FIGS. 10B-10E illustrate contents of data pages which may be used in cooperation with the data page of FIG. 10A;

FIGS. 11B-11H illustrate contents of data pages which may be used in cooperation with the data page of FIG. 11A;

FIG. 12C illustrates contents of a data page with ratings of a portfolio received by the subscriber of FIG. 12A;

FIGS. 14A-14D illustrate contents of data pages for registering a legal entity and administering to it an online version of a questionnaire for determining its sustainability ratings, according to embodiments of the invention.

DETAILED DESCRIPTION OF THE PREFERRED EMBODIMENT

Figure 1:
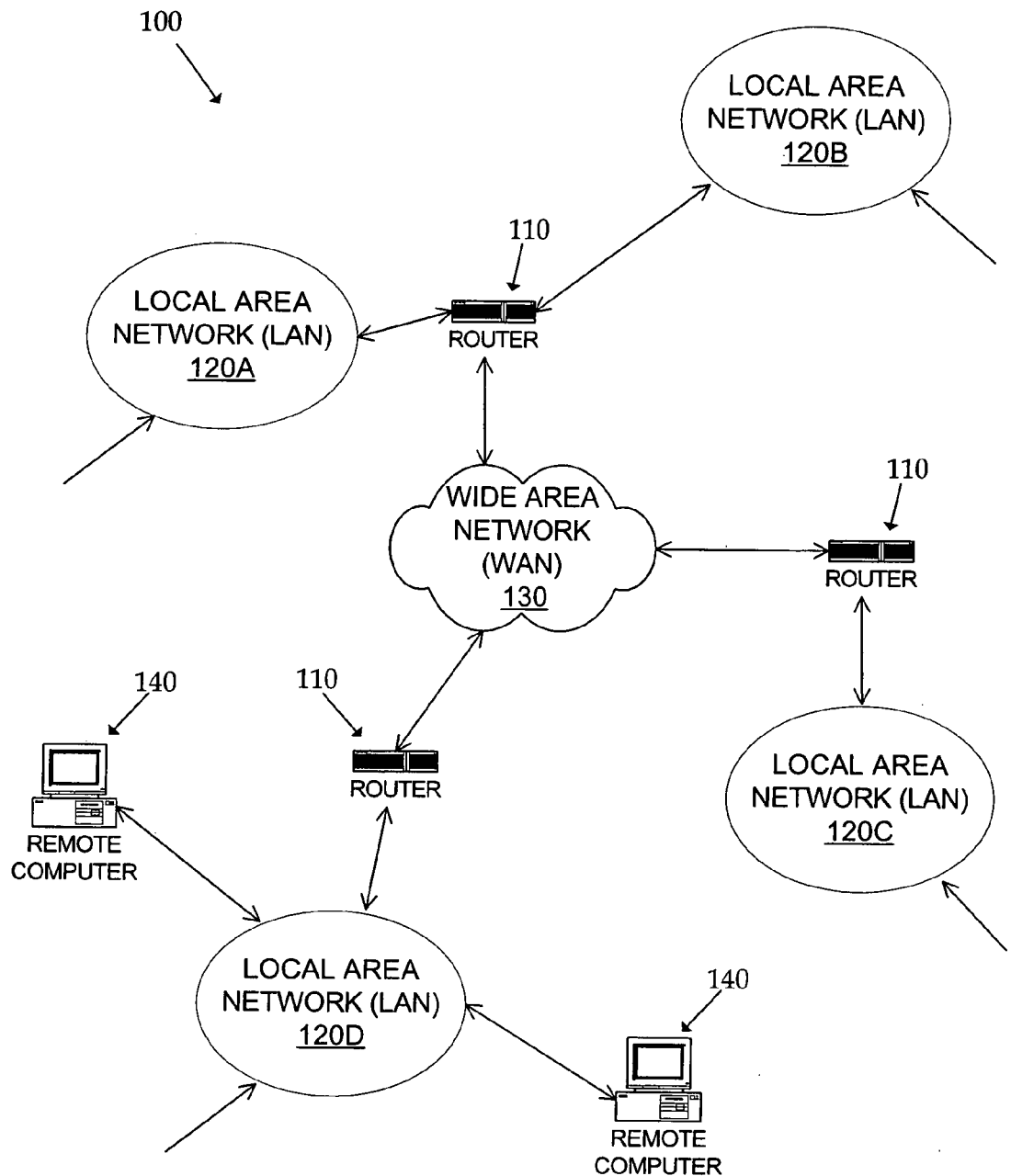
FIGS. 1-4 show schematic diagrams of an illustrative operating environment for the present invention.

By way of overview and introduction, the present invention provides a system for rating the sustainability of legal entities, such as companies and governments, senior executives, and products. The rating system computes a sustainability score for the entity, which is derived from its performance using both economic and non-economic type considerations. In one embodiment of the invention, a score is computed using data concerning a company's performance according to discrete sustainability criteria. These criteria may include the entity's impact on people and/or the environment, and to its own governance. A single score may be computed from all the criteria. Alternately, individual sustainability scores may be considered independently for each criterion, and/or be combined to produce a single composite sustainability score.

In a computer-implemented embodiment of the invention, data is stored concerning at least non-economic factors of legal entities, and is used to compute sustainability scores for those legal entities. Additional data can be stored to also account for economic factors; alternately such data or even otherwise computed scores for economic ratings may be imported from other sources (e.g., from a Bloomberg data feed).

The sustainability scores may be used to rate companies and governments either with respect to each other, or on a predefined scale. The ratings may be extended to include a rank within a group of entities, such as rating a company within its whole industry. Each score may be associated with a report, which can reveal facts that may better explain a poor score. The scores and reports can be made available either over the Internet, a wireless electronic device (e.g., a cellular telephone or other personal electronic device such as a personal digital assistant), by paper publications or television. Availability may be conditioned on a business rule, such as by subscription.

In one embodiment, the invention enables a user to input his or her own coefficient values, for computing customized sustainability scores. Coefficient values may be input by the user to either affect how individual scores are computed, or how they are combined to compute the composite score, or both. Accordingly, different investors may compute personalized scores that express their own ideologies or institutional preferences/perspectives.

The data is preferably stored in a memory structure, which may include a database. In one embodiment, companies provide the data to the database. Providing the data may be by entering it electronically, e.g. by replying to questions of an on-line questionnaire. Data may further be contributed by updates from the company or government, and by fact investigations in response to comments submitted by the public.

The invention is now described in more detail. While computer embodiments are predominantly described, such is by way of example and not of limitation.

Illustrative Operating Environment

FIGS. 1-4 show components of an exemplary environment in which the invention may be practiced. Not all the components may be required to practice the invention, and variations in the arrangement and type of the components may be made without departing from the spirit or scope of the invention. The particular component configuration is not critical to the present invention.

FIG. 1 shows a plurality of local area networks ("LANs") 120A-120D and wide area network ("WAN") 130 interconnected by routers 110. Routers 110 are intermediary communications network devices. On a single network linking many computers through a mesh of possible connections, a router receives transmitted messages and forwards them to their correct destinations over available routes. On an interconnected set of LANs—including those based on differing architectures and protocols—, a router acts as a link between LANs, enabling messages to be sent from one to another.

Communication links within LANs typically include twisted pair, fiber optics, or coaxial cable, while communication links between networks may utilize analog telephone lines, full or fractional dedicated digital lines including T1, T2, T3, and T4, Integrated Services Digital Networks (IS-DNs), Digital Subscriber Lines (DSLs), wireless links such as WiFi, WIMAX, GPRS, CDMA, TDMA, TSM, hybrids of the foregoing or future technologies, or other communications links known to those skilled in the art. Communication to the LAN (or WAN) is preferably by an interface unit associated with the client computer such as a remote computer 140.

Furthermore, computers, such as remote computer 140, and other electronic devices can be remotely connected to either LANs 120A-120D or WAN 130 via a modem and temporary telephone link. The number of WANs, LANs, and routers in FIG. 1 may be increased or decreased arbitrarily without departing from the spirit or scope of this invention.

As such, it will be appreciated that the Internet itself may be formed from a vast number of such interconnected networks, computers, and routers. Generally, the term "Internet" refers to the worldwide collection of networks, gateways, routers, and computers that use Transmission Control Protocol/Internet Protocol ("TCP/IP") and other packet based protocols to communicate with one another.

An embodiment of the invention may be practiced over the Internet without departing from the spirit or scope of the invention. An embodiment of the invention also may be practiced in a peer-to-peer or grid computing architecture, without departing from the spirit or scope of the invention.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as twisted pair, coaxial cable, fiber optics, wave guides and other wired media, and wireless media such as acoustic, RF, infrared and other wireless media.

Figure 2:
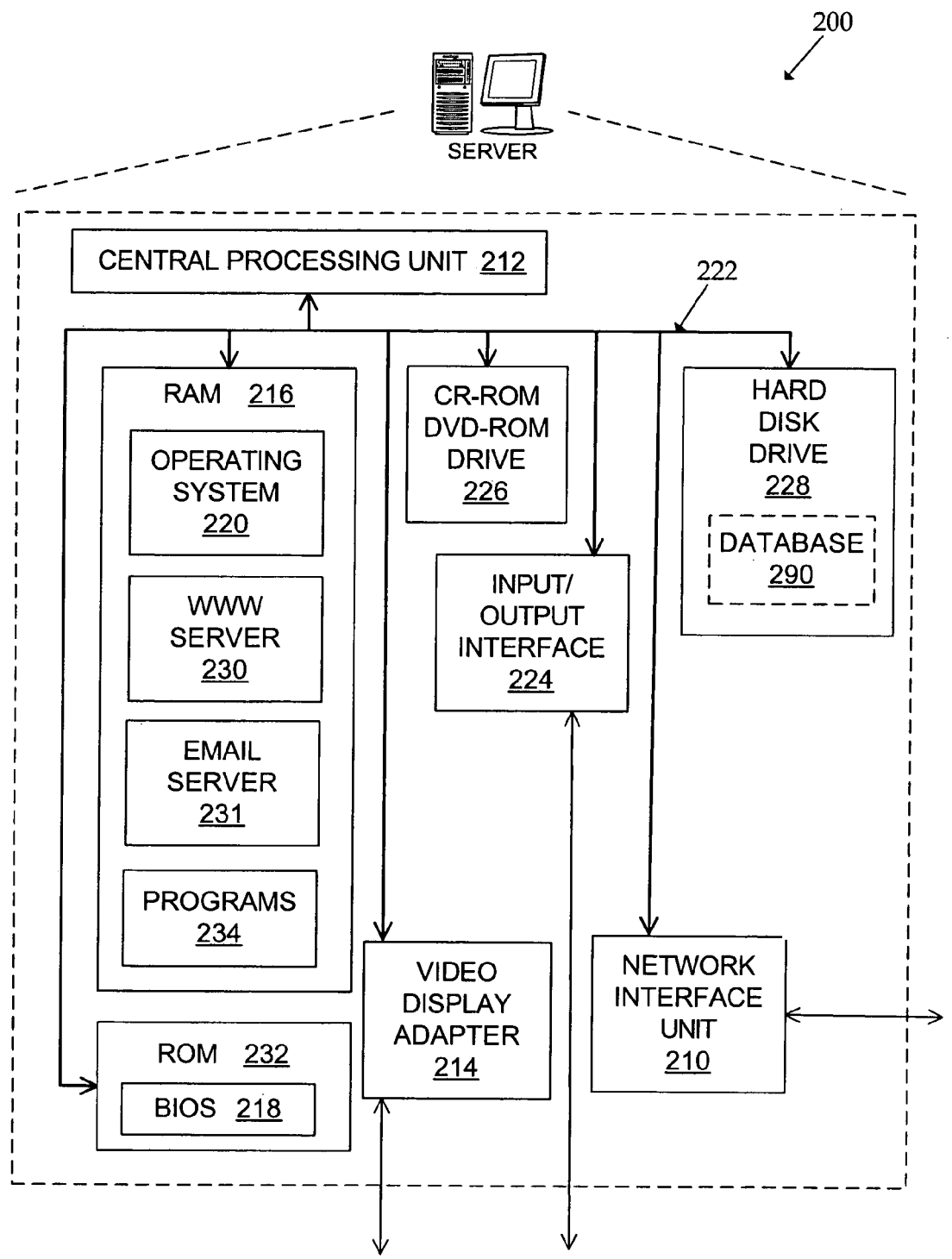

FIG. 2 shows an exemplary server for a communication network. Server 200 may operate to provide a World Wide Web site (web site), and an email system or a short message service (SMS) system, a multimedia system (MMS) for sending text and images or video in a single message, an instant messenger, and/or other message systems, among other things. When providing a web site, server 200 receives a request from a browser application of a different device in the network, and in response transmits back data configured as pages. For instance, server 200 may communicate pages and forms for setting up an email account for the user. Moreover, server 200 may transmit pages to a requesting device that allow the user to participate in a web site, such as send email to another user. The transactions may take place over the Internet, WAN/LAN 100, or some other communications network known to those skilled in the art.

Those of ordinary skill in the art will appreciate that the server 200 may include many more components than those shown in FIG. 2. However, the components shown are sufficient to disclose an illustrative environment for practicing the present invention. As shown in FIG. 2, server 200 is connected to WAN/LAN 100 or other communications network, via network interface unit 210. Those of ordinary skill in the art will appreciate that network interface unit 210 includes the necessary circuitry for connecting server 200 to WAN/LAN 100, and is constructed for use with various communication protocols such as the TCP/IP protocol. Typically, network interface unit 210 is a card contained within server 200.

Server 200 also includes central processing unit 212, video display adapter 214, and a mass memory, all connected via bus 222. The mass memory generally includes random access memory ("RAM") 216, read-only memory ("ROM") 232, and one or more permanent mass storage devices, such as hard disk drive 228, a tape drive (not shown), optical drive 226, such as a CD-ROM/DVD-ROM drive, and/or a floppy disk drive (not shown). The mass memory stores operating system 220 for controlling the operation of server 200. Basic input/output system ("BIOS") 218 is also provided for controlling the low-level operation of server 200. Hard disk drive 228 is utilized by server 200 to store, among other things, application programs, databases, and program data used by email server 231 and WWW server 230.

The mass memory as described above illustrates another type of computer-readable media, namely computer storage media. Computer storage media may include volatile and nonvolatile, removable and non-removable media, which can implemented in any method or technology for storage of information, such as computer readable instructions, data structures, program modules or other data. Examples of computer storage media include RAM, ROM, EEPROM, flash memory or other memory technology such as available from SanDisk of Sunnyvale, Calif., CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory may also store program code and data for providing a web site. More specifically, the mass memory may store applications including WWW server application 230, email server application 231, and programs 234. WWW server application 230 includes computer executable instructions which, when executed by server 200, generate browser displays, including performing the logic described above. Server 200 may include a JAVA virtual machine, an SMTP handler application for transmitting and receiving email, an HTTP handler application for receiving and handing HTTP requests, and an HTTPS handler application for handling secure connections. The HTTPS handler application may also be used for communication with an external security application to send and receive sensitive information, such as email, in a secure fashion.

Server 200 also comprises input/output interface 224 for communicating with external devices, such as a mouse, keyboard, scanner, or other input devices not shown in FIG. 2. Preferably, the server also supports text-to-voice conversion, voice-to-text conversion, or both, for communicating with a wide variety of client machines and permitting requests to the system and outputs of scores and ratings and other information from the system to be conveyed aurally and free of the need for a visual interface.

As mentioned above, the invention uses data concerning at least non-economic factors of legal entities, such as companies and governments. The data may be stored in a database 290, to which server 200 has access for computing the sustainability scores. In one embodiment, database 290 resides on hard drive 228, but that is not necessary; indeed, database 290 may even be external to server 200 yet in communication therewith.

Figure 3:
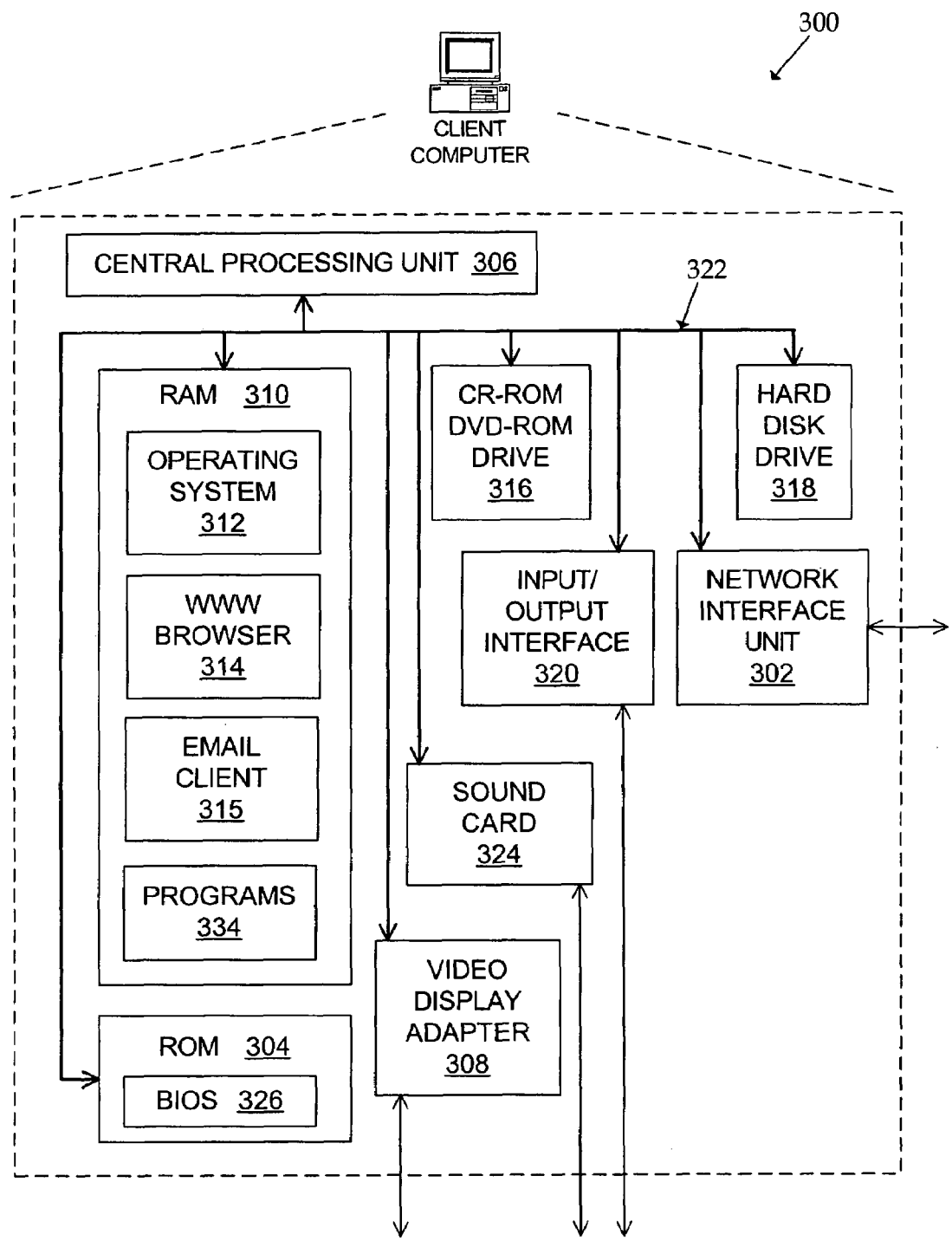

FIG. 3 depicts several components of client computer 300. Those of ordinary skill in the art will appreciate that client computer 300 may include many more components than those shown in FIG. 3. However, it is not necessary that those generally-conventional components be shown in order to disclose an illustrative embodiment for practicing the present invention.

As shown in FIG. 3, client computer 300 as one embodiment of the remote computer 140 includes network interface unit 302 for connecting to a LAN or WAN directly or remotely. Those of ordinary skill in the art will appreciate that network interface unit 302 includes the necessary circuitry, software, or both, for such a connection, and is also constructed for use with various communication protocols including the TCP/IP protocol, the particular network configuration of the LAN or WAN it is to be connecting to, and a particular type of coupling medium. Network interface unit 302 may also be capable of connecting to the Internet through a point to point protocol ("PPP") connection, or a serial line internet protocol ("SLIP") connection as known to those skilled in the art.

Client computer 300 preferably also includes central processing unit (CPU) 306, video display adapter 308, and memory. The memory generally includes RAM 310, ROM 304 and a permanent mass storage device, such as a disk drive. The memory stores operating system 312, BIOS 326, and programs 334 for controlling the operation of client computer 300. The memory also includes email client 315 for accessing email over a network, and browser application 314 for accessing web sites. It will be appreciated that these components may be stored on a computer-readable medium and loaded into memory of client computer 300 using a drive mechanism associated with the computer-readable medium, such as a floppy disk drive (not shown), optical drive 316, such as a CD-ROM/DVD-ROM drive, and/or hard disk drive 318. Input/output interface 320 may also be provided for receiving input from a mouse, keyboard, or other input device. The memory, network interface unit 302, video display adapter 308, and input/output interface 320 are all connected to processing unit 306 via bus 322. Other peripherals, for example sound card 324, may also be connected to processing unit 306 in a similar manner. For example, the interface may also be provided at a terminal (shown as part of an icon), for displaying accessed data, computed scores, and so on.

It should be understood that the remote computer (i.e., the client machine) could be embodied as any one of a great variety of electronic devices ranging from general purpose computing machines such as workstations, desktop, laptop and notebook computers, to less general devices such as personal digital assistants (PDAs) or smart phones, to a special purpose devices such as DVB-H enabled mobile devices. Regardless of the physical form of the remote computer, it preferably includes a local memory, a processor, interface unit functionality, and input/output capabilities to permit interaction with a user.

Figure 4:
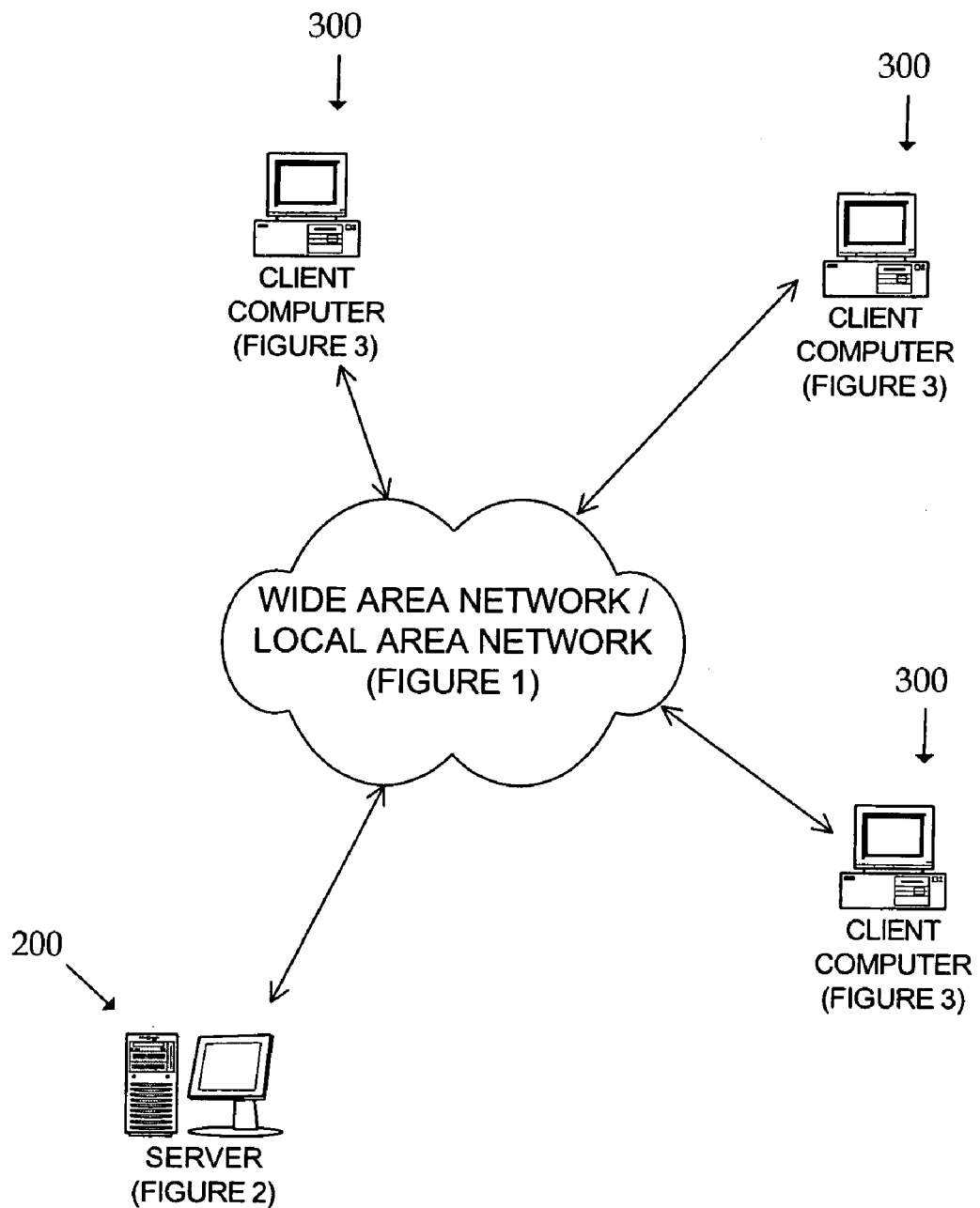

FIG. 4 illustrates an overview of an exemplary environment in which the invention operates in which multiple clients 300 can be in communication with at least one server 200 that provides email services over network 100. Although FIG. 4 refers to client computer 300 as an exemplary client device, other types of client devices may be employed with the invention. For example, multiprocessor systems, microprocessor-based or programmable consumer electronics, network PCs, PDAs, wearable computers, and the like. These client devices may also include devices that typically connect to network 100 using a wireless communications medium, e.g., mobile telephones, smart phones, pagers, walkie talkies and other radio frequency (RF) devices, infrared (IR) devices, integrated devices combining one or more of the preceding devices, and the like.

Methods

Methods of the invention are now described. These methods may be standalone methods, or computer implemented methods such as implemented by software and so on. While the examples described below refer to companies, their subsidiaries, and their industry groups, they are also intended to apply respectively to governments, their departments, and international country groups, such as trading blocks and so on.

Figure 5:
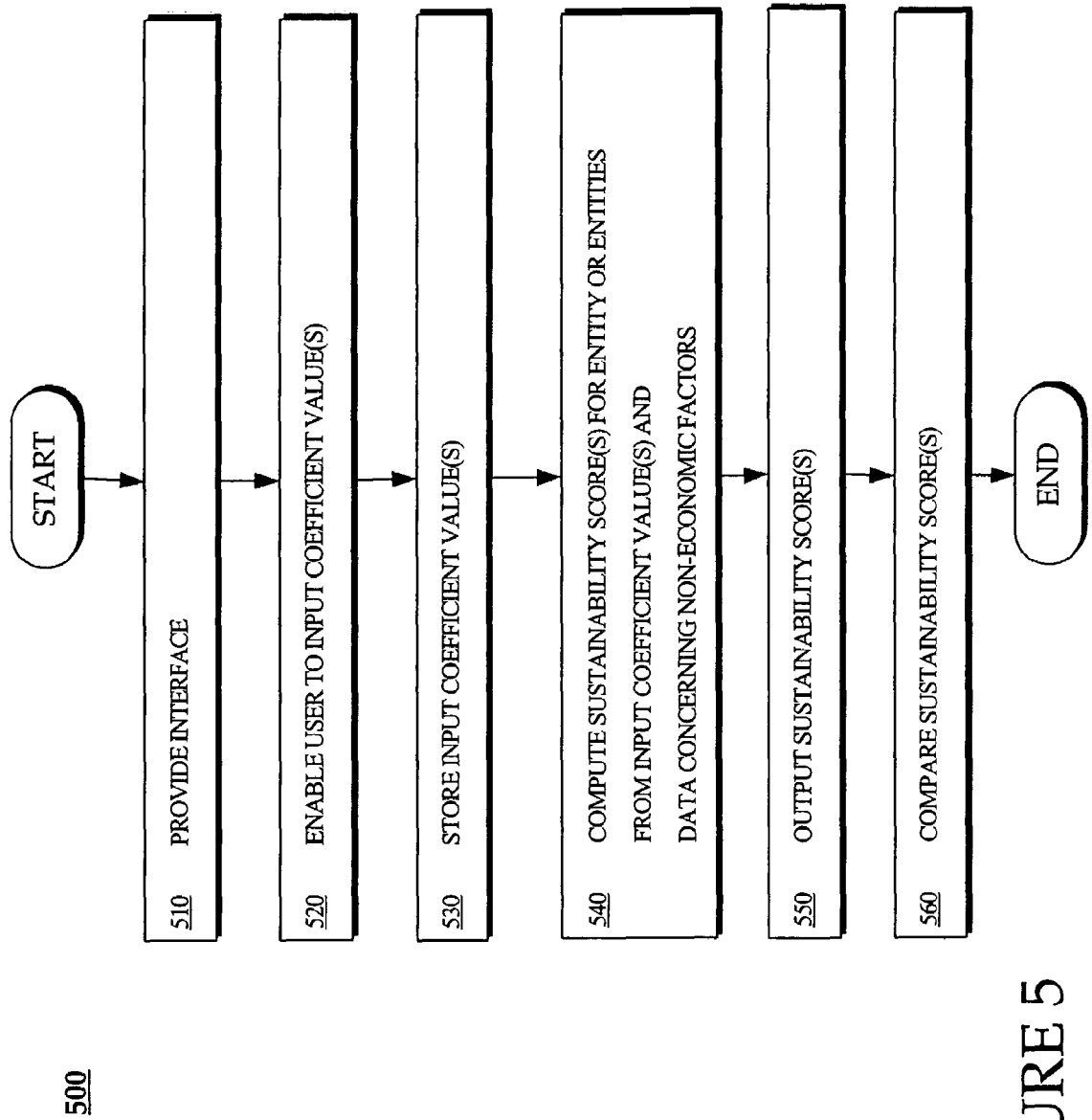
FIG. 5 is a flowchart illustrating a method according to an embodiment of the present invention.

FIG. 5 is flowchart 500 for illustrating a method according to an embodiment of the invention. The method of flowchart 500 may be practiced by different embodiments of the invention, including but not limited to server 200, software, and so on.

Moving from the START block, the process advances to block 510, where an interface is provided, such as at a terminal. At next block 520, a user is enabled to input one or more coefficient values through the interface. At optional next block 530, the user-input coefficient value or values are stored, preferably in an account associated with the user.

At next block 540, a sustainability score is computed for a particular company or industry, using the user-input coefficient value and stored data that concerns at least one non-economic factor about a company, whether it is a parent company or a subsidiary company, and so on. In the preferred mode, the stored data includes social, environmental and governance criteria among the non-economic factors, but fewer or additional criteria can be employed. In addition, the preferred mode includes economic factors in computing a sustainability score. Computation of the sustainability score is described below (see discussion of FIG. 8). The interface further enables the user to select one of the companies, and the computing step uses the stored data for the selected company. The sustainability score may be a single score, or include one or more individual scores that correspond to discrete sustainability criteria. In one embodiment, these criteria include an economic rating, a social responsibility rating, an environmental responsibility rating, and a corporate governance rating. In the computation, the coefficient value may be used to compute one of the individual scores, or affect how individual scores are combined in computing a composite sustainability score.

In some embodiments, the stored data concerns non-economic factors for multiple companies, each of which belongs to an industry. The interface further enables the user to select one of the industries, and the computing step uses the stored data concerning each of the companies in the selected industry. Accordingly, sustainability scores for entire industries may be computed, from stored data concerning non-economic factors of companies in the industry.

At next block 550, the computed sustainability score or scores are output, such as through the interface, to the terminal mentioned above, or a printer, etc. At optional next block 560, sustainability scores for respective companies or even industries may be compared. Comparison may be by benchmarking a computed score against a reference score. The reference score may be simply another entity's score, or an average score of members of a group such as an industry, and so on. Benchmarking may thus be on an absolute scale, or on a comparative scale as to a company, or as to a rank within its industry. Comparison may be facilitated with ratings that may be derived from scores, as will be described below. The process then moves to an END block.

Figure 6:
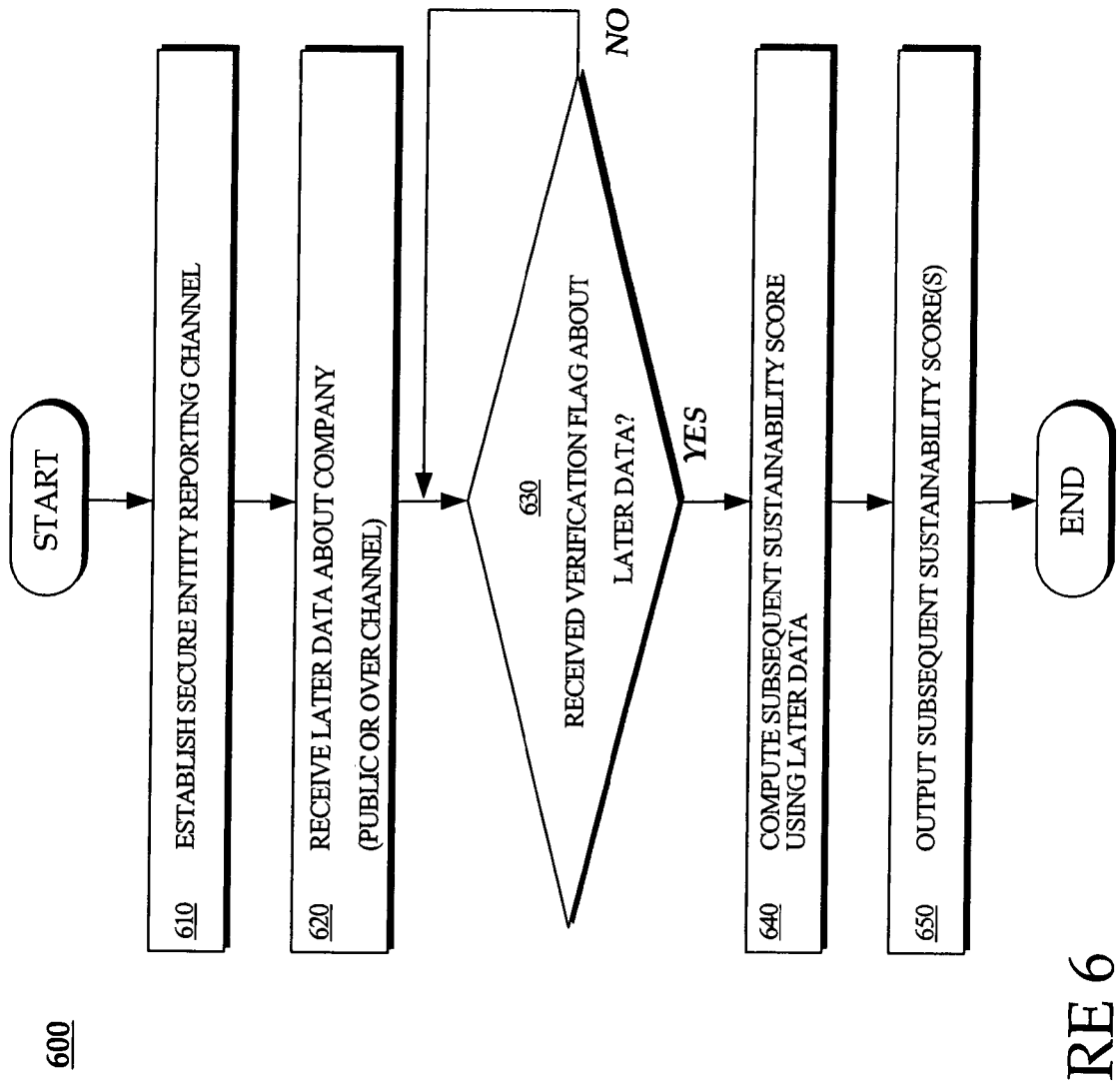
FIG. 6 is a flowchart illustrating another method according to an embodiment of the present invention.

FIG. 6 is flowchart 600 illustrating a method according to another embodiment of the invention, which relates to entry of data and updates of data. The method of flowchart 600 may be practiced by different embodiments of the invention, including but not limited to server 200 in conjunction with client 300, software, and so on.

Moving from the START block, the process advances to optional block 610, where a secure entity reporting channel is preferably established, and which is intended for use by a company through its authorized representative. Alternatively, a non-secure communication link can be established and used, but in either case, communication links are established in a conventional manner. At next block 620, later or subsequent data about a company is received, which concerns at least one non-economic factor for the company.

The subsequent data may be received from the public, or from the company such as through the secure channel. The subsequent data may be received as a response to an initial questionnaire, or as an update to a question in the questionnaire, or as a response to an inquiry that may have arisen from a public comment.

At next block 630, a verification flag is awaited, which respects the subsequent data. Waiting is by inquiring if the flag has been received, and proceeding only if the answer is YES. If the answer is NO, then waiting is accomplished by redirecting to block 630, e.g. after some time delay, and so on. At next block 640, a subsequent sustainability score is computed for the company, using the subsequent data that has been received later. The subsequent score may thus be an update from an initial score. Updates can be performed at any interval or randomly, but preferably are performed annually, quarterly, monthly, or in realtime (that is, as soon as new information is available to the system, the formula's are run again, or are run in response to a subscriber request for rating or score information). Alternatively, updates can reflect averages of information, such as (e.g.,) a 45-day trailing average computed using data over that trailing average interval.

At next block 650, the computed subsequent sustainability score or scores are output, such as through the interface, the terminal mentioned above, a printer, and so on. The process then moves to an END block.

Operation

Figure 7:
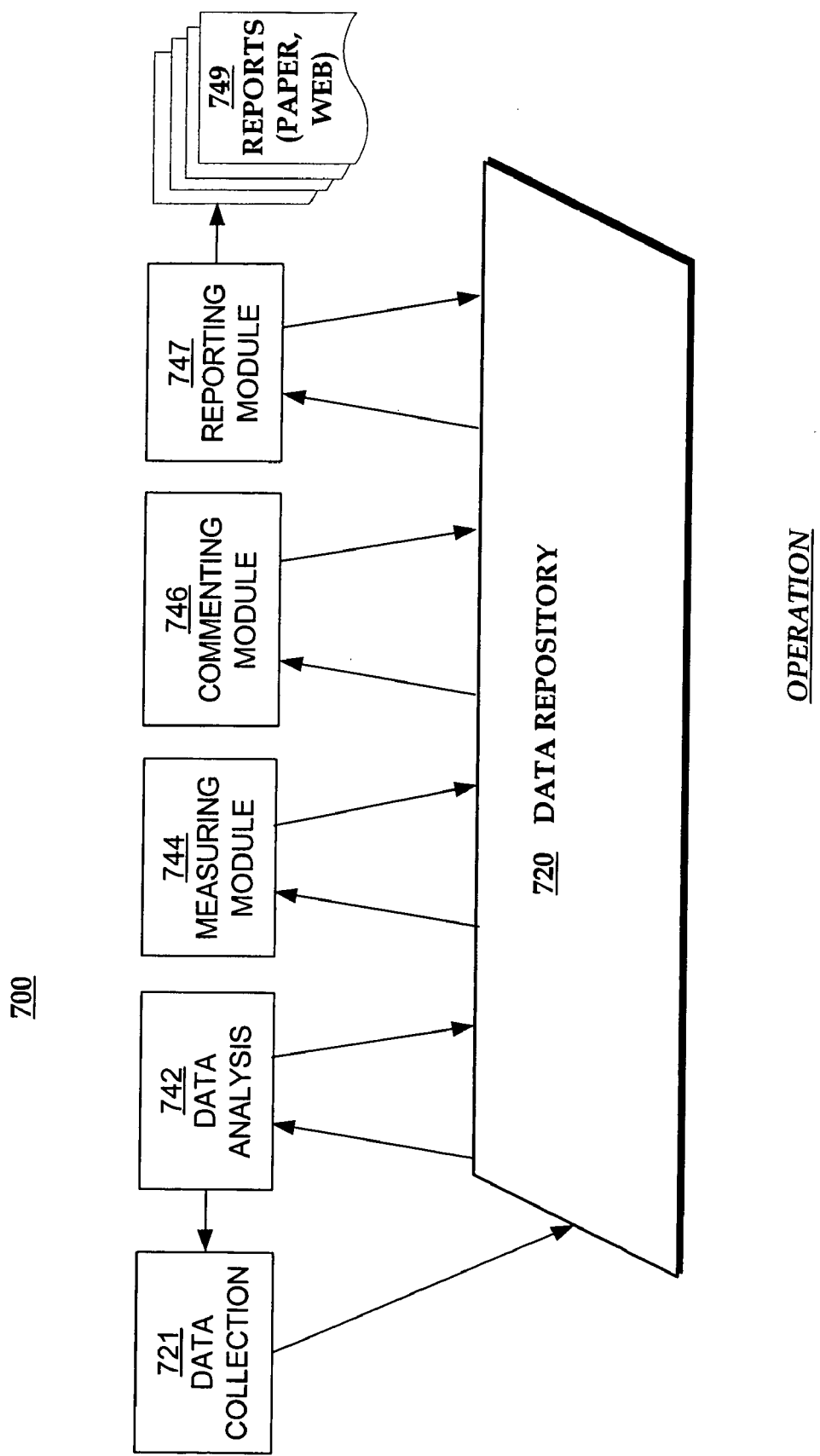
FIG. 7 is a block diagram for illustrating modules interacting to implement a sustainability rating reporting operation.

FIG. 7 is a block diagram for illustrating preferred modules interacting to implement operation 700 for determining sustainability ratings according to an embodiment of the invention. Data repository 720 may store data of various types concerning at least non-economic factors of companies. While a single repository 720 is shown, it will be understood that repository 720 can be either a single unit, or composed of many units. Data collection module 721 collects data, and stores it in repository 720. Data analysis module 742 analyzes raw data, stores intermediate results back in repository 720, and may further interact with data collection module 721. Measuring module 744 converts raw and intermediate data into scores, which it then stores back into repository 720. Commenting module 746 processes comments that are to be associated with scores or the company to which the scores pertain, and then stores them back into repository 720. Reporting module 747 accesses stored scores and comments to generate integrated reports 749 including static and/or animated graphs, if desired, which may be published on paper, through an interface such as a web browser or other electronic device interface, and also be further stored in repository 720 for repeat or subsequent access.

Figure 8:
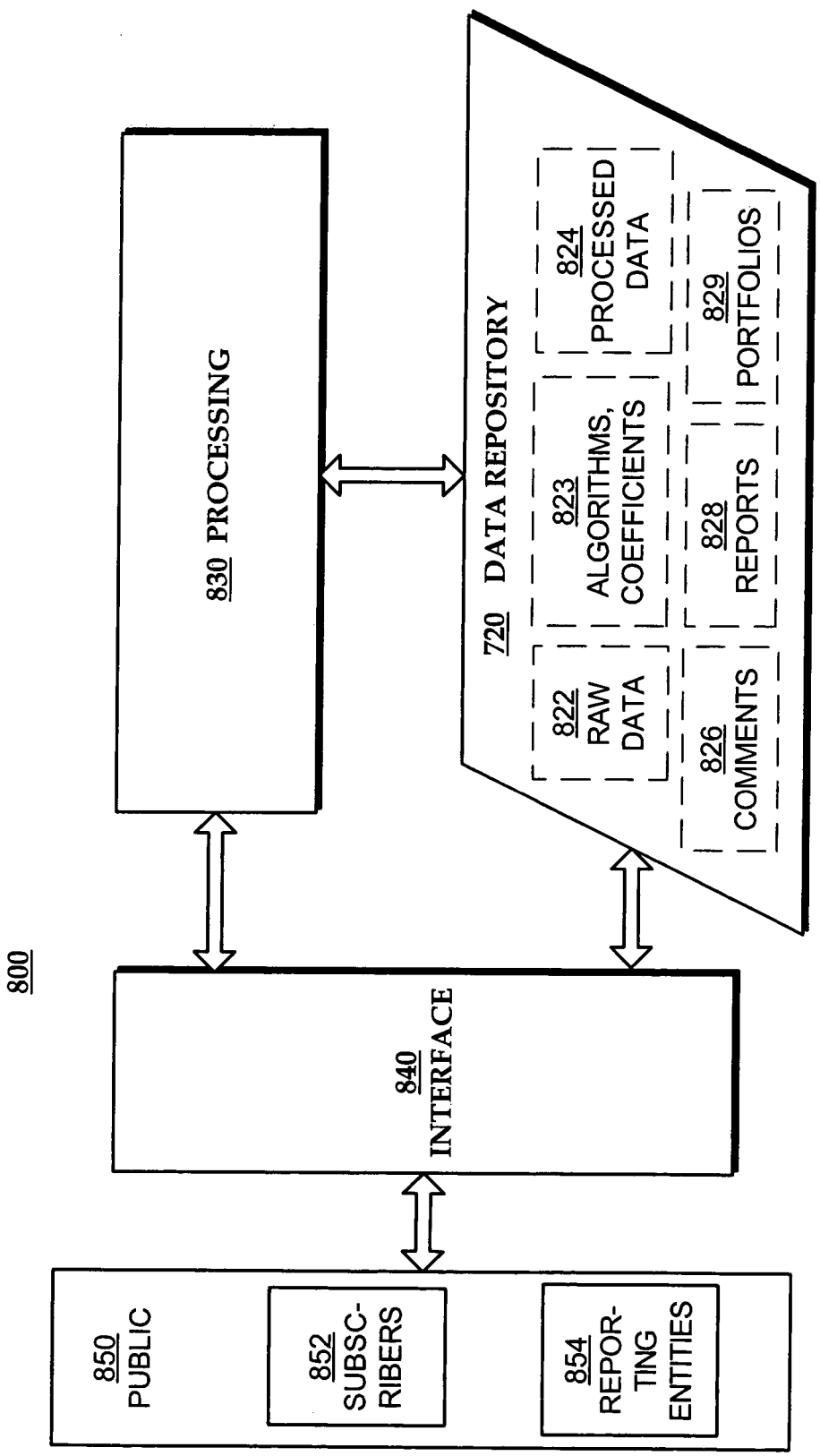
FIG. 8 is a block diagram to illustrate a general architecture for supporting the operation of FIG. 7.

FIG. 8 is a block diagram to illustrate architecture 800 for implementing operation 700 of FIG. 7 in accordance with this embodiment of the invention. As also per the above, data repository 720 stores many types of data, such as raw data group 822, and algorithms and coefficients group 823 that includes descriptions of how algorithms convert data into score components. The algorithm(s) can take a variety of forms but preferably represents a relationship among a number of criteria that are individually weighted and combined to define a score in a particular area (e.g., a societal sustainability rating, an environmental sustainability rating, a governance sustainability rating, and an economic sustainability rating). The scores in each area can be combined into a composite score in a number of ways, optionally using further weighting coefficients as detailed below in connection with FIGS. 11A-G. Repository 720 also stores processed data group 824 that can include scores and score components, which may be computed from the raw data of group 822 using algorithms from group 823. Repository 720 further stores comments group 826 that includes comments. Repository 720 additionally stores reports group 828, which can include processed data from group 824 and comments from group 826. Repository 720 may optionally also include portfolios group 829, which keeps ownership and/or tracking accounts associated with respective users.

Data repository 720 is accessible by processing component 830, and both are accessible from the outside via interface 840. Interface 840 can be accessed by members of the public 850, which may include subscribers' subset 852 and reporting entities' subset 854. It is to be noted that subscribers in subset 852 may have different access privileges than the members of the public 850, and yet different than those of the reporting entities in subset 854. In addition, within subset 852 there may be different levels of access depending on subscription levels, and so on.

Figure 9:
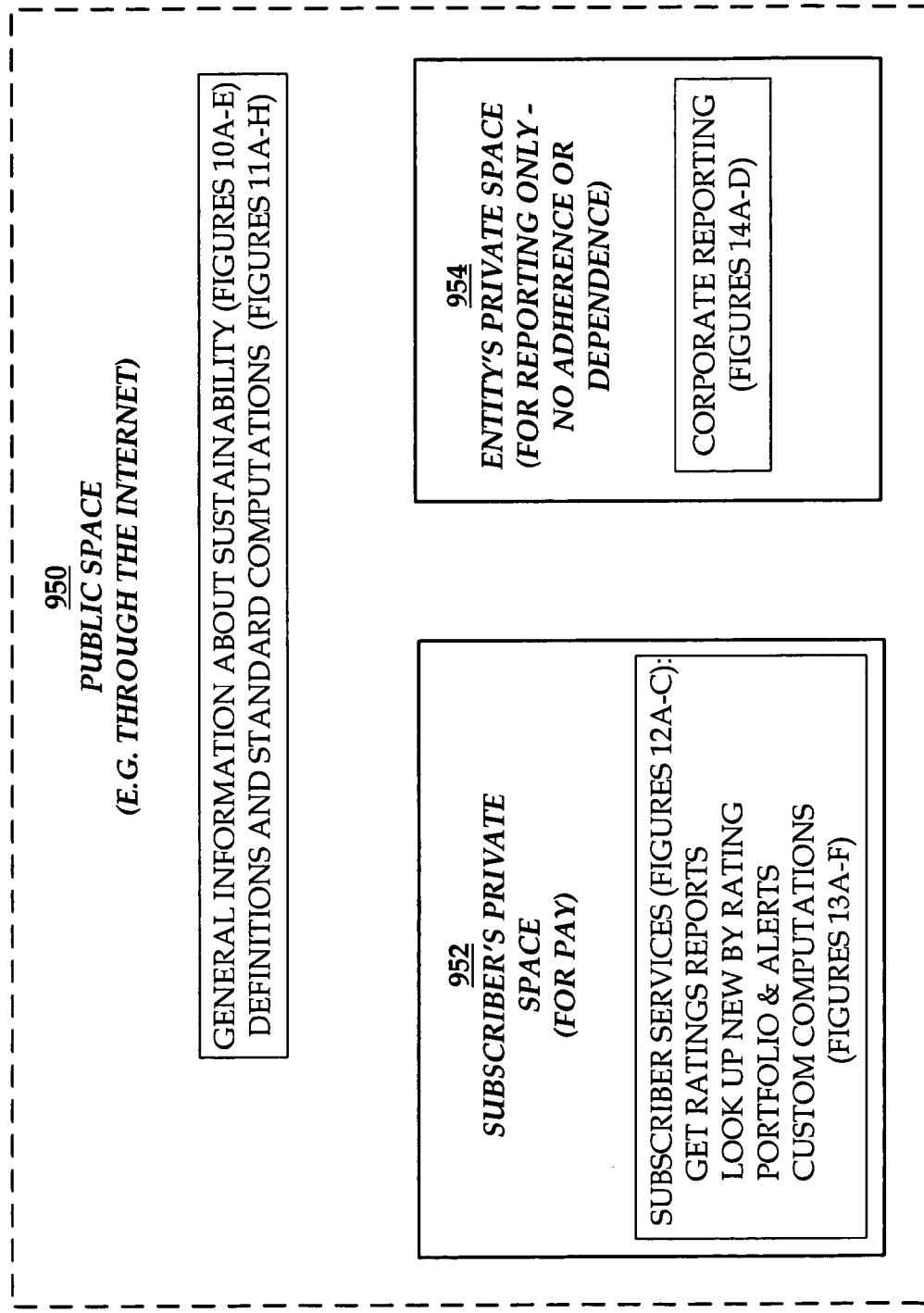
FIG. 9 illustrates windows for differentiating which elements are visible to which parties in an embodiment of the architecture of FIG. 8.

FIG. 9 illustrates windows for differentiating which elements are visible to which parties in an embodiment of the architecture of FIG. 8. Window 950 can be a public space that can be seen by any member of the public 850. Window 950 can contain general information about sustainability, as further described and illustrated later in FIGS. 10A-10E, definitions and standard computations of scores, as further described and illustrated later in FIGS. 11A-11H, as well as other free information to entice or tease the public into becoming subscribers.

In addition to public space 950, paying subscribers 852 such as companies that are rated by the system (e.g., as provided by architecture 800) have access to private space 952, through some control function such as a password. Access to space 952 enables subscriber services, such as are described and illustrated later in FIGS. 12A-12C. The subscriber services include receiving ratings reports, ratings for whole custom portfolios and alerts, and custom computations, such as are described and illustrated later in FIGS. 13A-13F.

In addition to public space 950, reporting entities 854 have access to private space 954, such as through a secure channel. Access to space 954 enables entities to report on their activities, such as is described and illustrated later in FIGS. 14A-14C.

Illustrative Web Embodiment

An embodiment will now be presented, as an example for implementing the invention over the World Wide Web. An actual embodiment does not need to be through the exact sample web pages shown, and may be implemented in many other ways. In this example, words and concepts appearing in the sample drawings are to be considered as part of this written description; in some instances such words and description are not duplicated in the text of this specification for brevity.

Figure 10A:
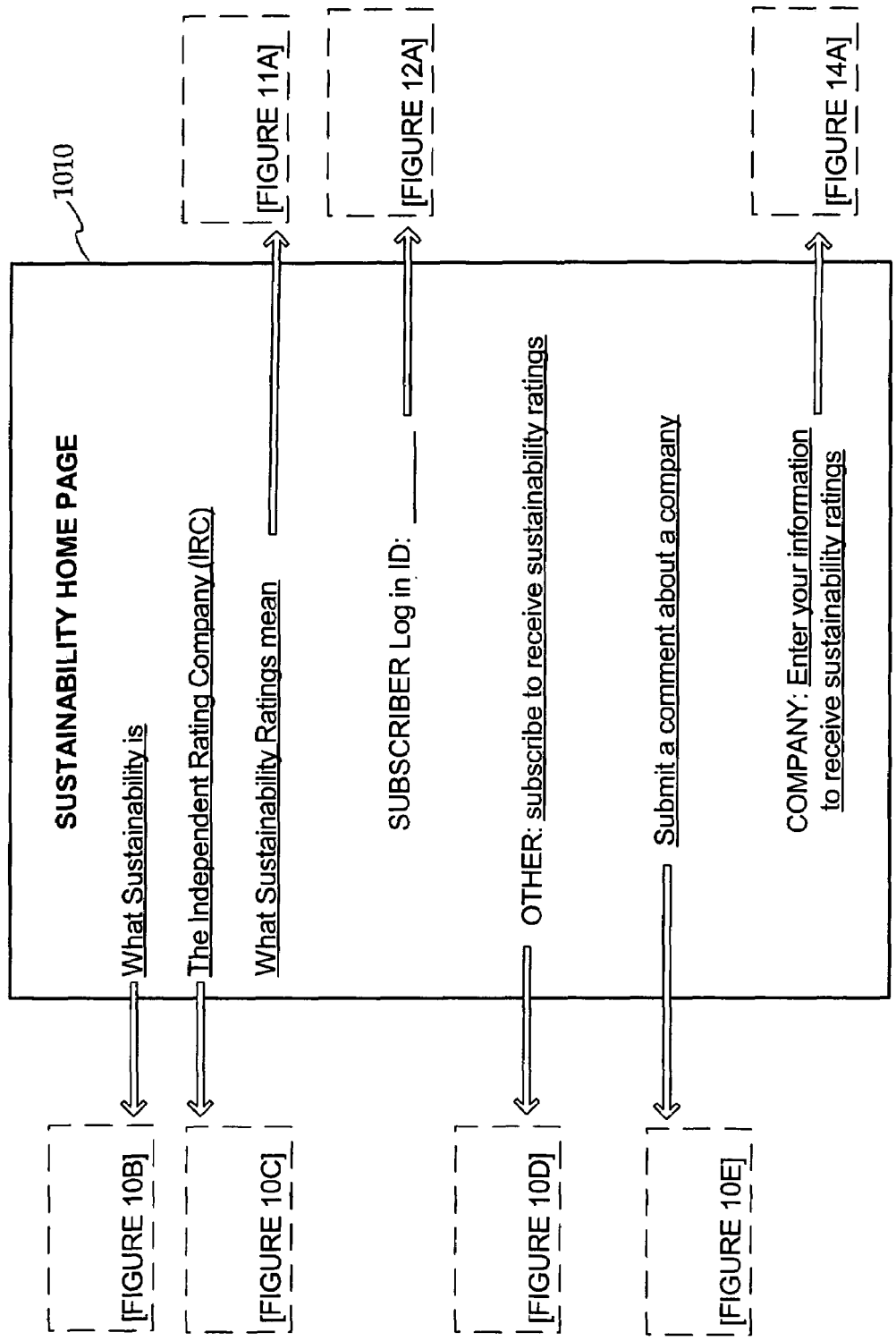
FIG. 10A illustrates contents of a general data page such as a home page of an entity for implementing a web interface of the architecture of FIG. 8.
Figure 10C:
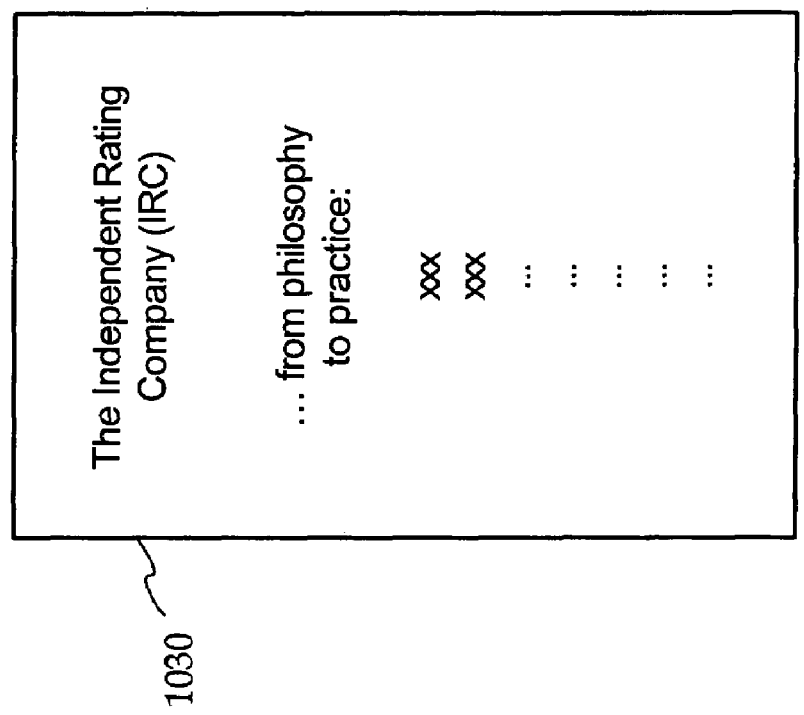
Figure 10B:
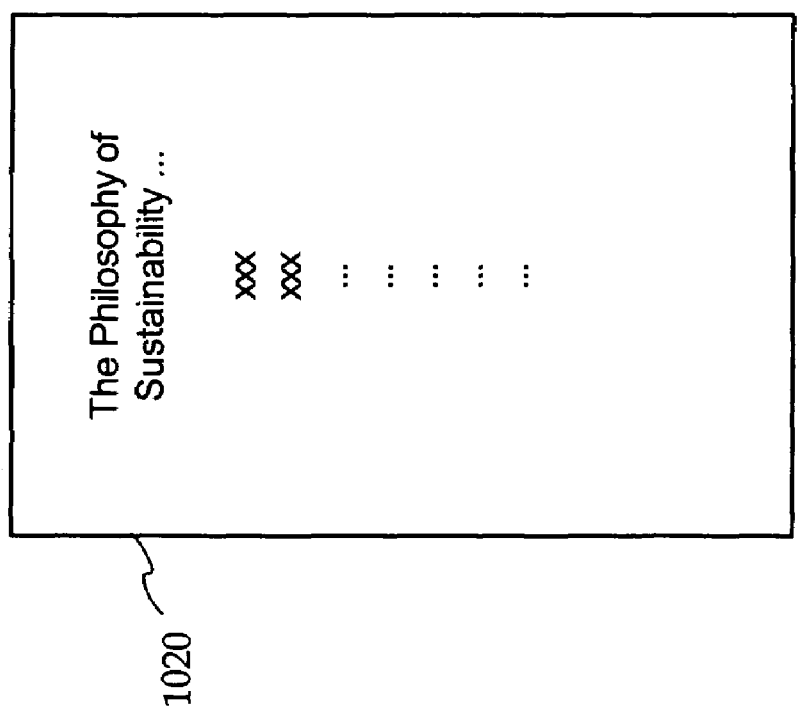

FIG. 10A illustrates contents of general data page 1010, belonging in public space 950. Page 1010 may be a starting home webpage of an entity for implementing the invention. Page 1010 may have links to informative pages, such as shown in FIGS. 10B and 10C. In this example, in FIG. 10B, a page 1020 explains the philosophy of sustainability, while in FIG. 10C, a page 1030 presents information about the Independent Rating Company ("IRC") that is offering the sustainability data to the public and to subscribers.

From page 1010 of FIG. 10A, a link may transport the viewer to page 1040 of FIG. 10D, at which subscription possibilities are explained and enabled. Further from page 1010 of FIG. 10A, a link may transport the viewer to page 1050 of FIG. 10E, at which a comment may be submitted about a company. In one embodiment, the comment may be submitted through a representative, such as an attorney.

Figure 11A:
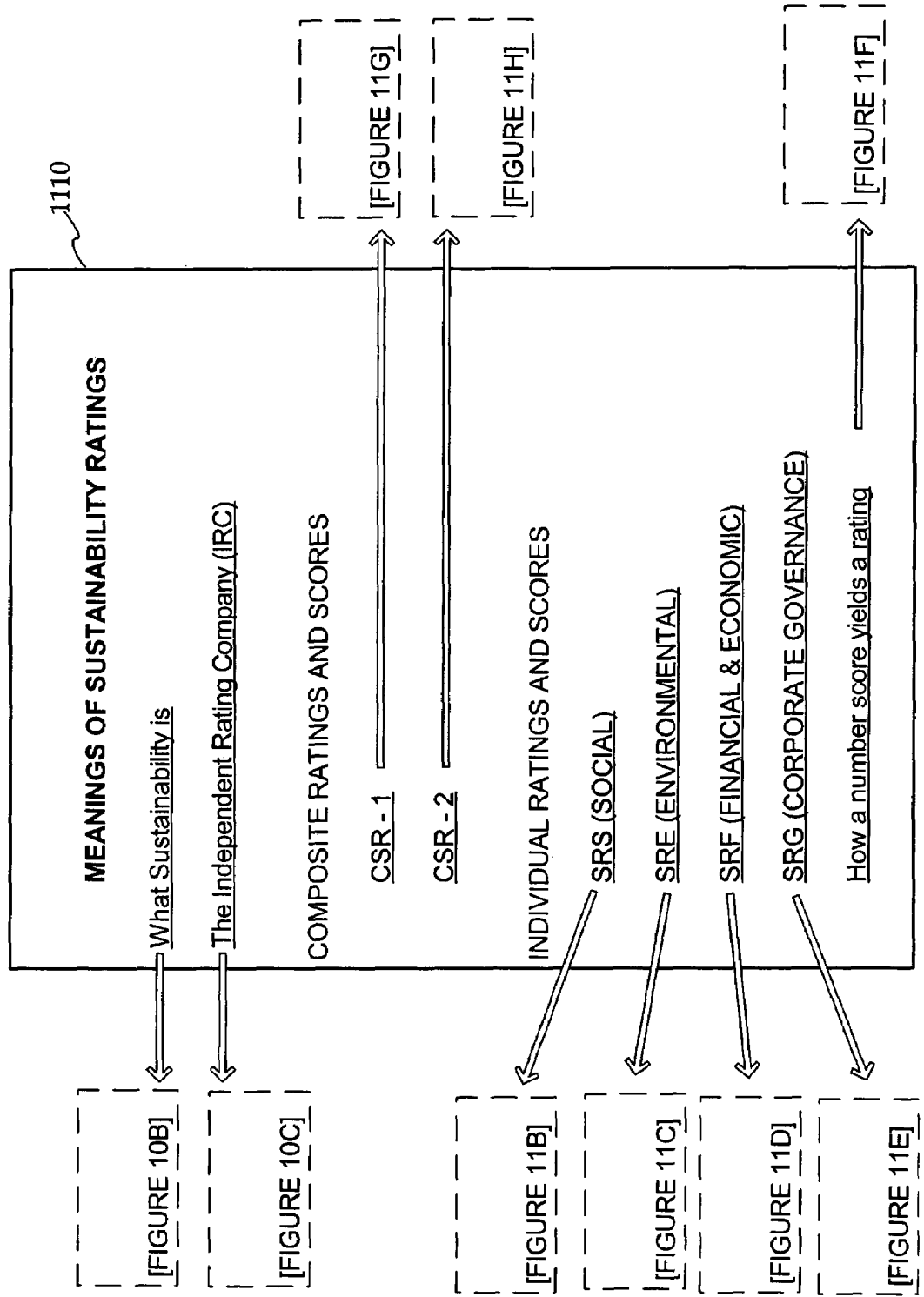
FIG. 11A illustrates contents of a data page routing to pages detailing the meaning of certain sustainability ratings.

Additionally from page 1010 of FIG. 10A, a link may transport the viewer to page 1110 of FIG. 11A, from which meanings of sustainability ratings may be learned. In this example, page 1110 lists proposed names for individual ratings and scores, and also for composite ratings and scores. Further in this example, clicking on a proposed name transports the viewer to another webpage that describes the computational logic behind the proposed name.

Figure 11B:
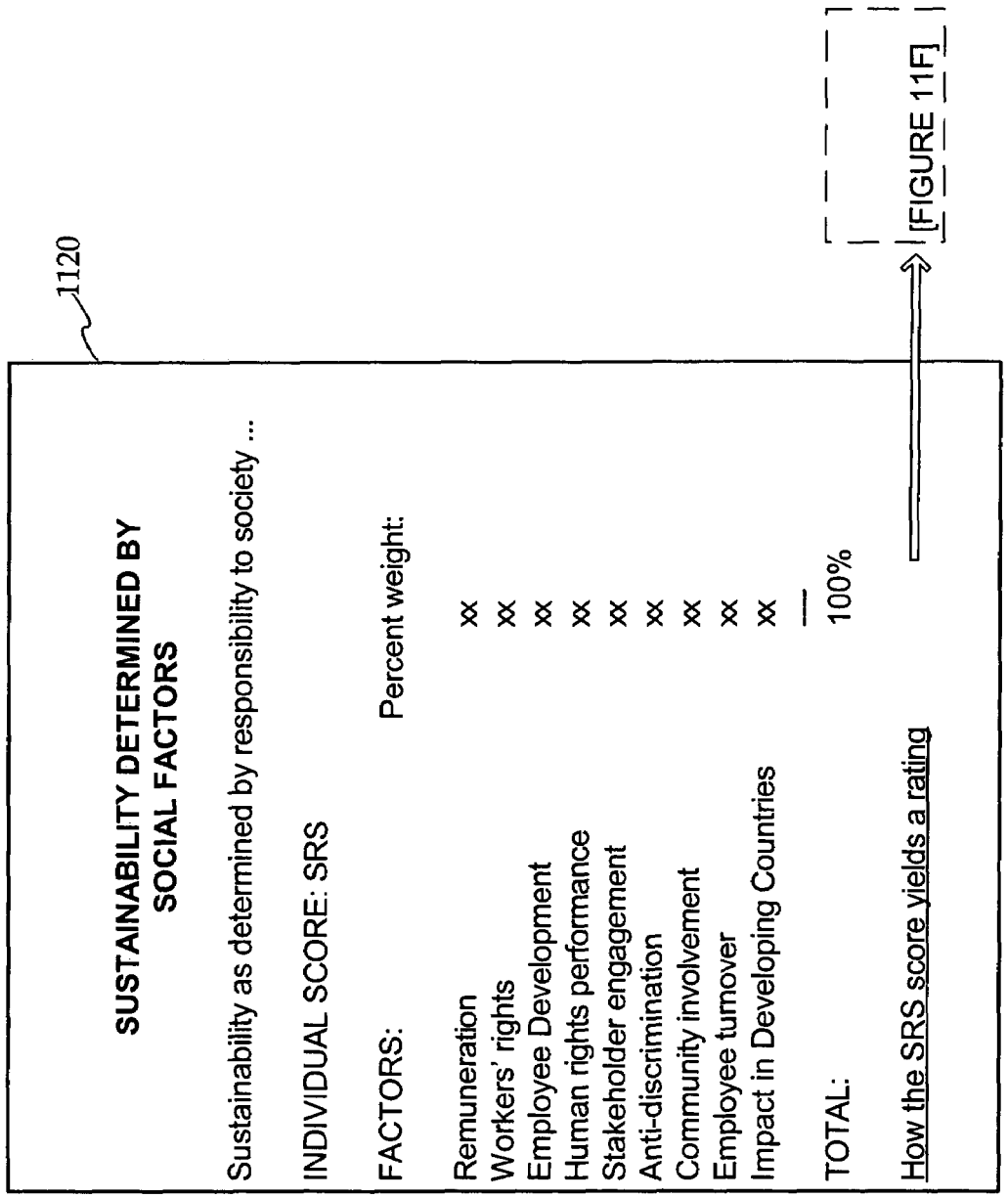
Figure 11C:
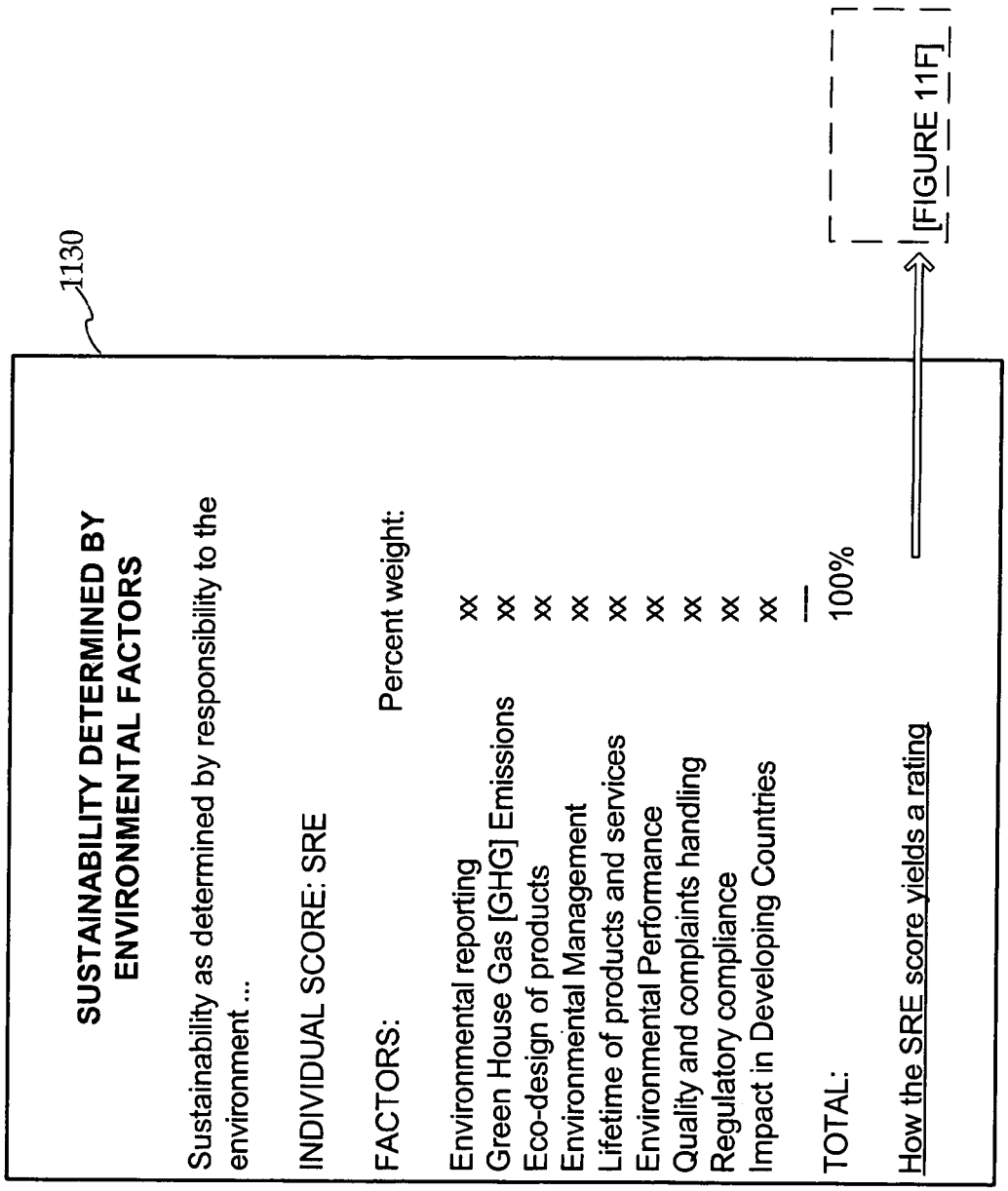
Figure 11D:
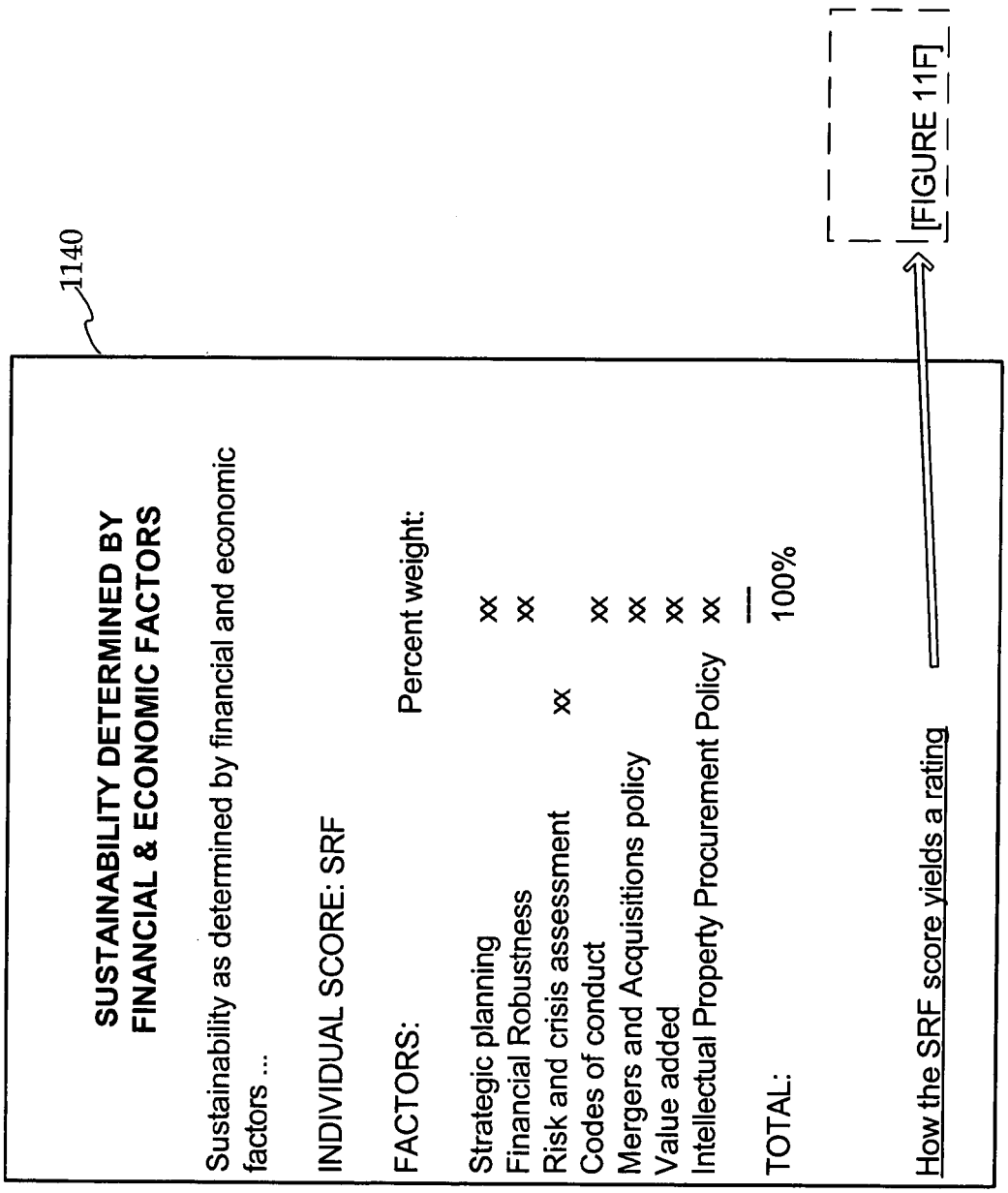
Figure 11E:
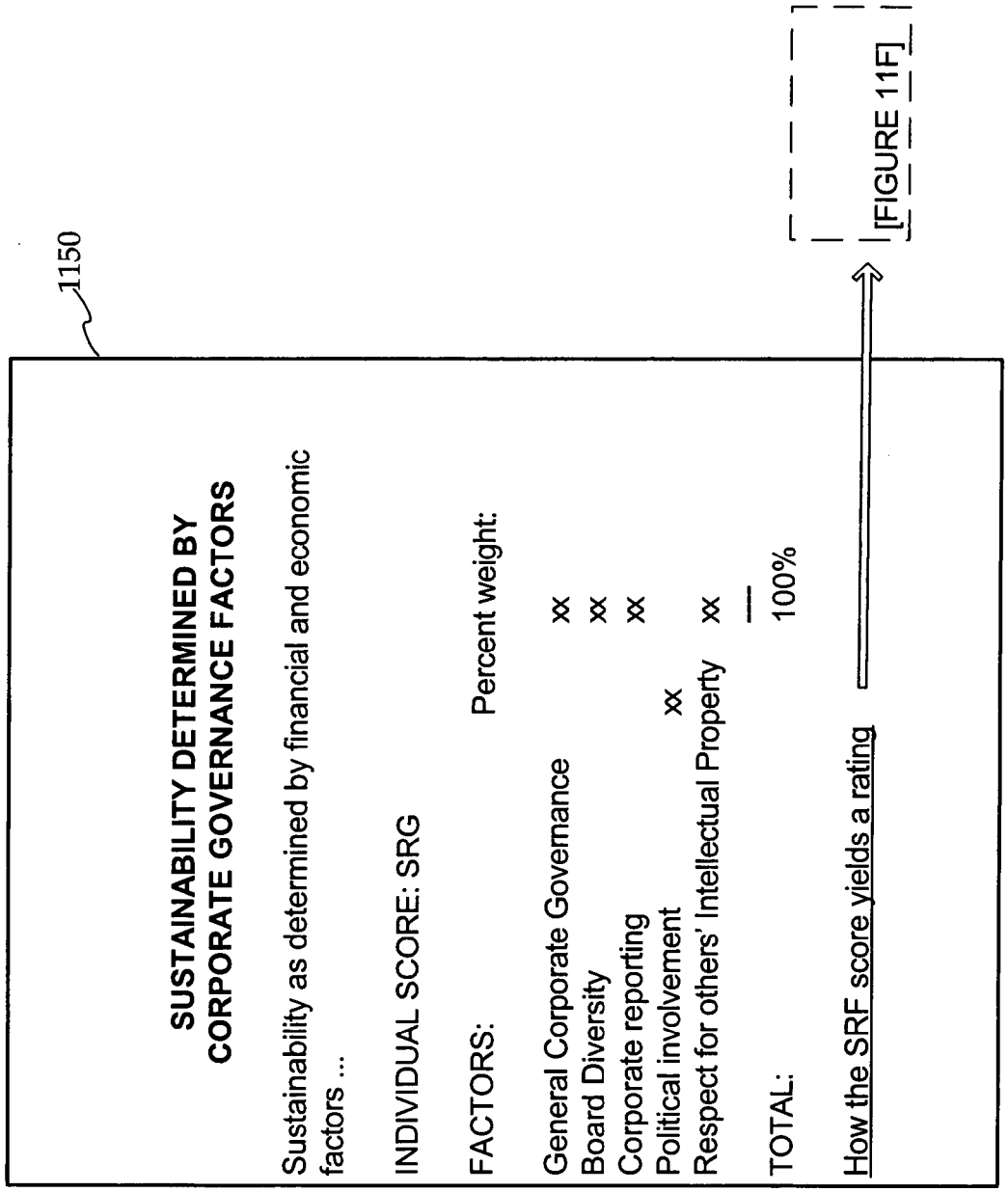
Figure 11F:
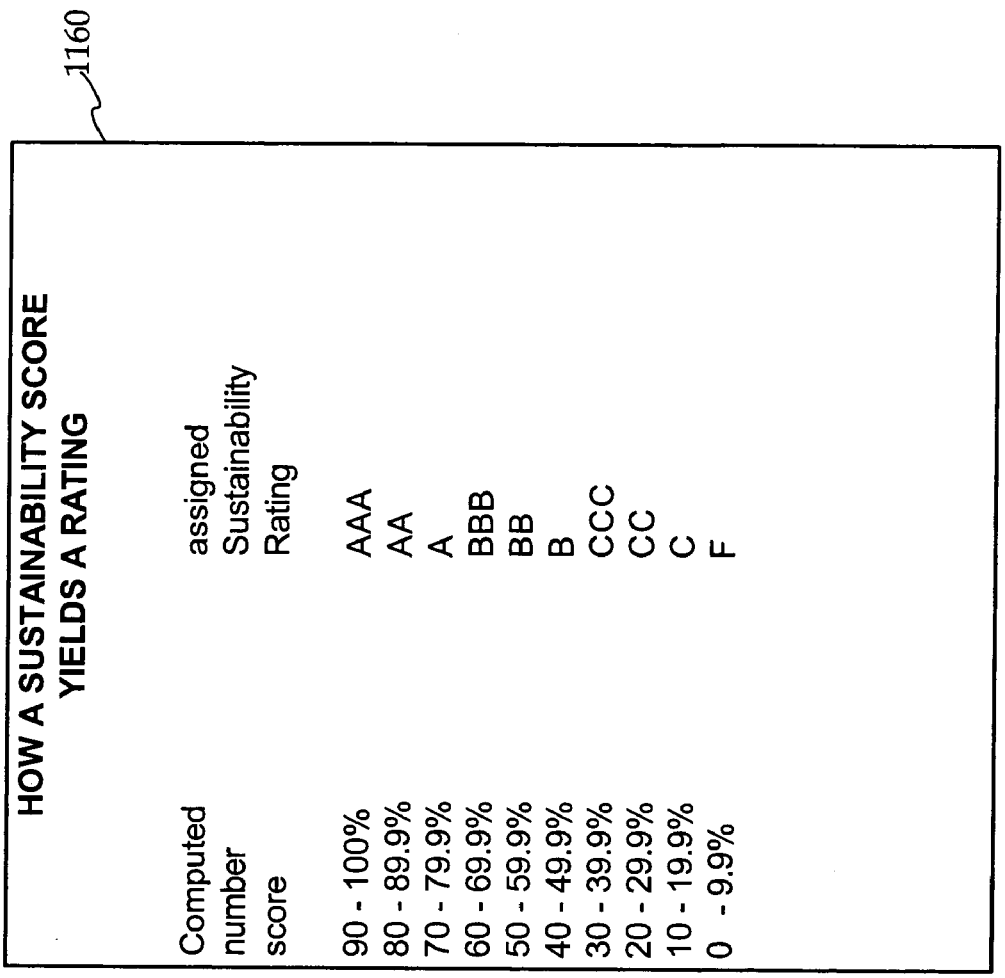

In terms of individual scores, a link from page 1110 causes the display of page 1120 of FIG. 11B, which describes how a sustainability score SRS is determined in terms of social factors. Another link from page 1110 takes to page 1130 of FIG. 11C, which describes how a sustainability score SRE is determined in terms of environmental factors. An additional link from page 1110 takes to page 1140 of FIG. 11D, which describes how a sustainability score SRF is determined in terms of financial and economic factors. Another link from page 1110 takes to page 1150 of FIG. 11E, which describes how a sustainability score SRG is determined in terms of corporate governance factors. A further link from page 1110 takes to page 1160 of FIG. 11F, which describes how a sustainability score yields a rating. In this example, a score is a range of numbers that may be computed for a score, and a rating is a symbol (such as AA) that designates a score within the range.

Each of the factors or criteria included in a sustainability score preferably is associated with a weighting, and the weighting is preferably expressed as a percentage of the overall score. Each factor is preferably assigned a percent weight given that factor's importance to the particular score. The selection of the percent weighting to be ascribed to a particular factor can be informed by guidelines and standards of global organizations such as included in the Global Reporting Initiatives 2002 Guidelines produced by the Global Reporting Initiative, a collaboration center of the United Nations Environment Programme, and also as recommended by the World Business Council for Sustainable Development, or can be informed by the stated criteria of financial institutions or pension funds, as two examples, or—in accordance with a particular embodiment of the invention discussed below—can be informed by the user-settings which impart that user's perspective, standards, or ideals to yield a unique computation of a sustainability score from a central database of corporate and industry information.

In terms of composite scores, computations for two examples are shown. A link from page 1110 takes to page 1170 of FIG. 11G, which describes how a first composite sustainability score CSR-1 is determined by adding together individual scores SRS, SRE, SRF, SRG according to respective weighting coefficients a, b, c, d. Another link from page 1110 takes to page 1180 of FIG. 11H, which describes how a second composite sustainability score CSR-2 is determined by multiplying together individual scores SRS, SRE, SRF, SRG, along with a further coefficient g. Other examples may of course be implemented. The weighting coefficients can be selected using the same or different considerations that inform the selection of percentage weights used in computing the individual sustainability scores.

It should be noted that, in these embodiments, all of the above pages are provided in public space 950 of FIG. 9, from which all visitors can see them. This way the public at large can appreciate the objectivity of the computed sustainability ratings.

Figure 12A:
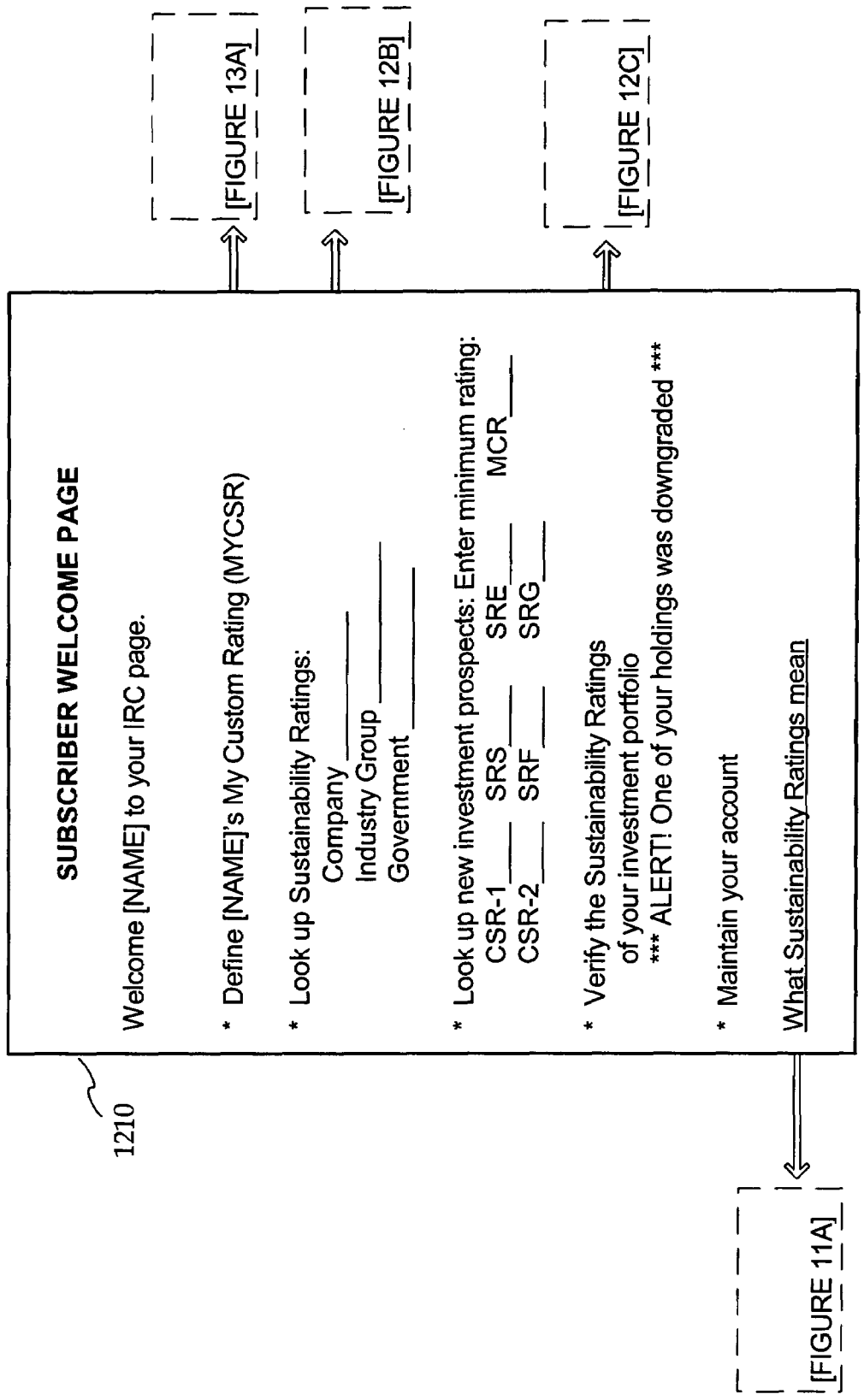
FIG. 12A illustrates contents of a data page routing to pages for use by a subscriber of sustainability ratings.

Returning to FIG. 10A, a login name and a password may transport the viewer from page 1010 to page 1210 of FIG. 12A, which is located in the subscribers' private space 952 of FIG. 9. Page 1210 is a welcome page, which permits various actions to the subscribing viewer.

Figure 12B:
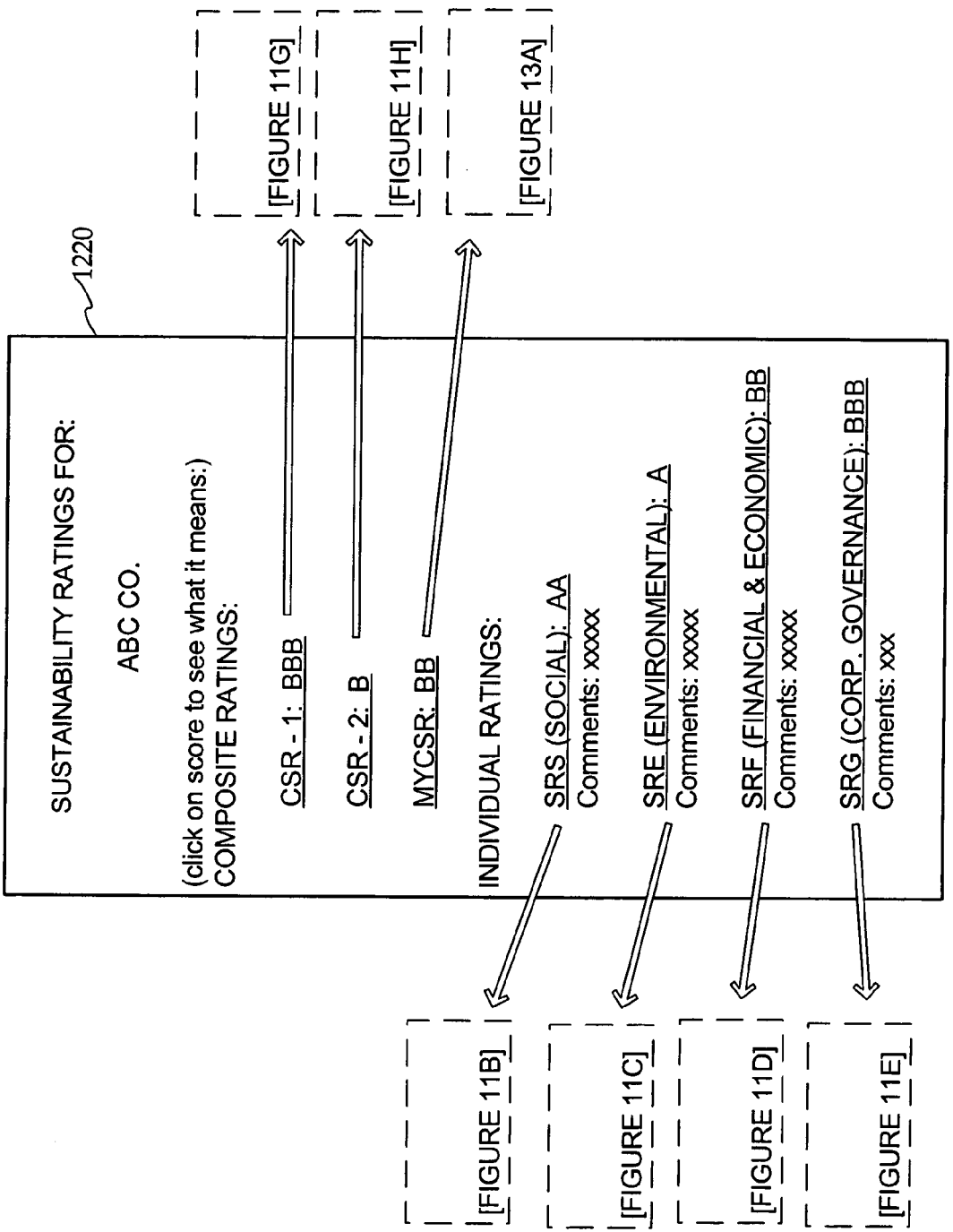
FIG. 12B illustrates contents of a data page with ratings of a company received by the subscriber of FIG. 12A.

Page 1210 permits a viewer to look up the ratings of a company, industry group or government, as a benefit of the subscription. As seen in FIG. 12B, a page 1220 reports sustainability ratings for a hypothetical ABC Company. The ratings for the company are both the individual ratings (SRS, SRE, SRF, SRG), and the composite ones (CSR-1, CSR-2). Again, each rating name may contain a link to a page that describes it, as seen above.

Page 1210 further permits a subscriber to enter a portfolio of investment holdings or of potential investments that are being monitored (that is, are on watch) by the subscriber. As seen in FIG. 12C, a page 1230 reports sustainability ratings for a hypothetical portfolio. In this example, the ratings are customized, and named MYCSR as is described below. A portfolio aggregate sustainability index can thus be computed. Further, the portfolio monitoring service can show the relationship of each investment to the aggregate, along with alerts if a certain holding has been downgraded. Page 1230 particularly also has the option to be printed, so that it can be included in investment reports. Held verses monitored investments can be distinguished in page 1230, though no monitored investments are shown in this figure. Also, portfolio data can be imported into the system using a suitably configured application program interface (API), as understood by those of skill in the art.

A salient feature of a preferred embodiment of the invention is that a subscriber can be enabled to customize their computation of the sustainability score. As seen in page 1210 of FIG. 12A, the user is given the option to define a custom computation, which transports them to page 1310 in FIG. 13A. Additionally, in page 1220 of FIG. 12B and page 1230 of FIG. 12C, custom scores MYCSR is also computed.

Figure 13A:
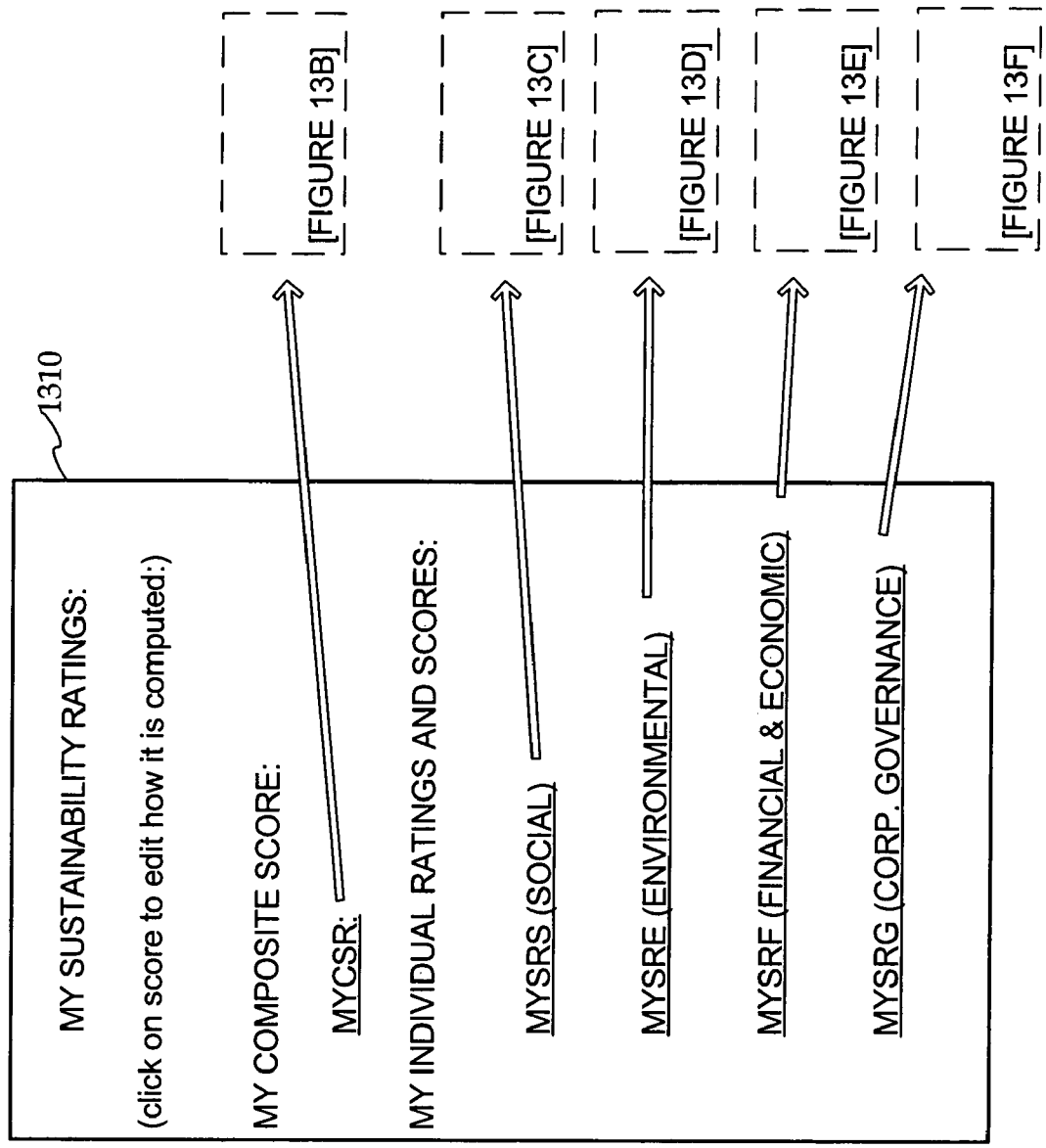
FIGS. 13A-13F illustrate contents of data pages for permitting a user such as a subscriber to customize how sustainability ratings are computed.

Referring to FIG. 13A, page 1310 gives examples of which computations may be customized. Individual ratings and scores MYSRS, MYSRE, MYSRF, MYSRG may be defined by the user in custom form, instead of the provided respective standard SRS, SRE, SRF, SRG scores described above in connection with FIG. 11A. In addition, a custom composite score MYCSR may be defined by the user instead of either standard CSR-1 or CSR-2. The names of the customized ratings are underlined, providing links to other pages that permit the customizing.

Figure 13B:

FIG. 13B shows a page 1320 for customizing how composite sustainability score MYCSR is computed. While the MYCSR score is an addition of individual scores MYSRS, MYSRE, MYSRF, MYSRG weighted by individual respective coefficients MYa, MYb, MYc, MYd, it is permitted to edit any one of these factors by clicking on it which opens its properties and permits its value to be changed. The coefficients may be edited in this page, while the individual scores may be edited in other pages.

Figure 13C:
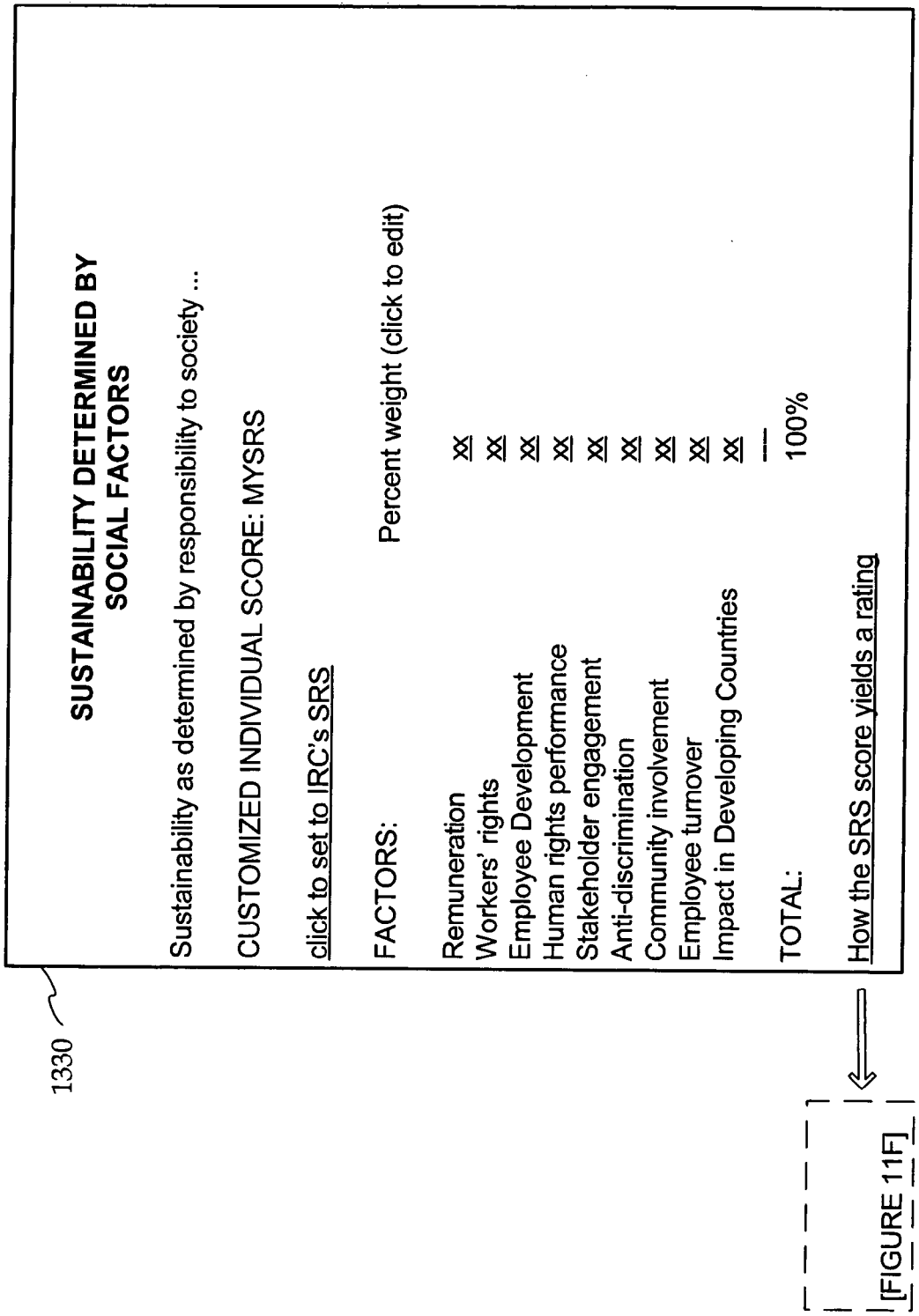

FIG. 13C shows a page 1330 for customizing how an individual social sustainability score MYSRS is computed. Score MYSRS is computed from factors in the left hand column, as weighted by percentages in the right hand column. Any one of these percentages may be edited by clicking on it, as described above. Default values can be restored by resetting the values, say, to IRC's values, by selecting a suitable link such as the one shown in this figure.

Figure 13D:
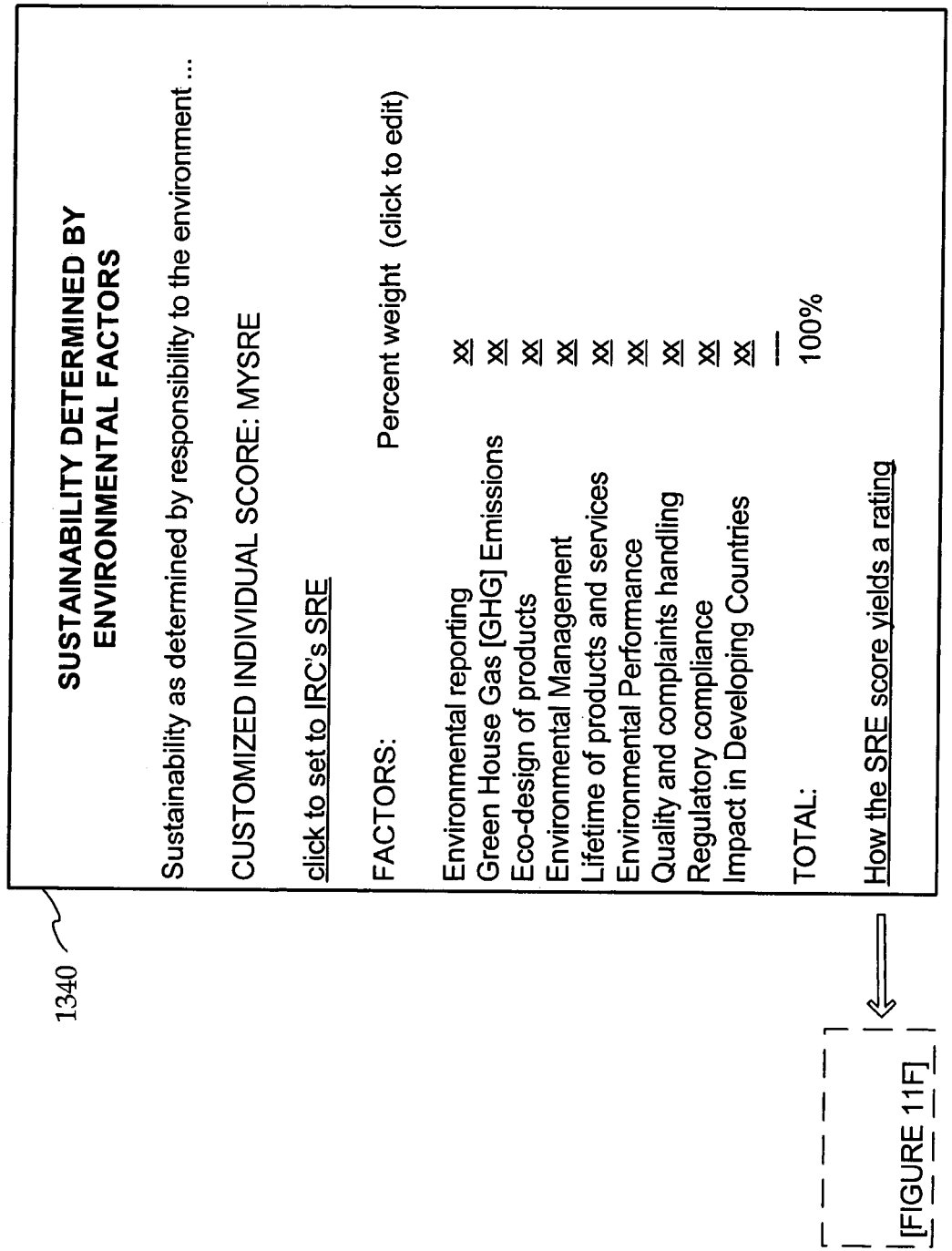

FIG. 13D shows a page 1340 for customizing how an individual environmental sustainability score MYSRE is computed. Score MYSRE is computed from factors in the left hand column, as weighted by percentages in the right hand column. Any one of these percentages may be edited by clicking on it.

Figure 13E:
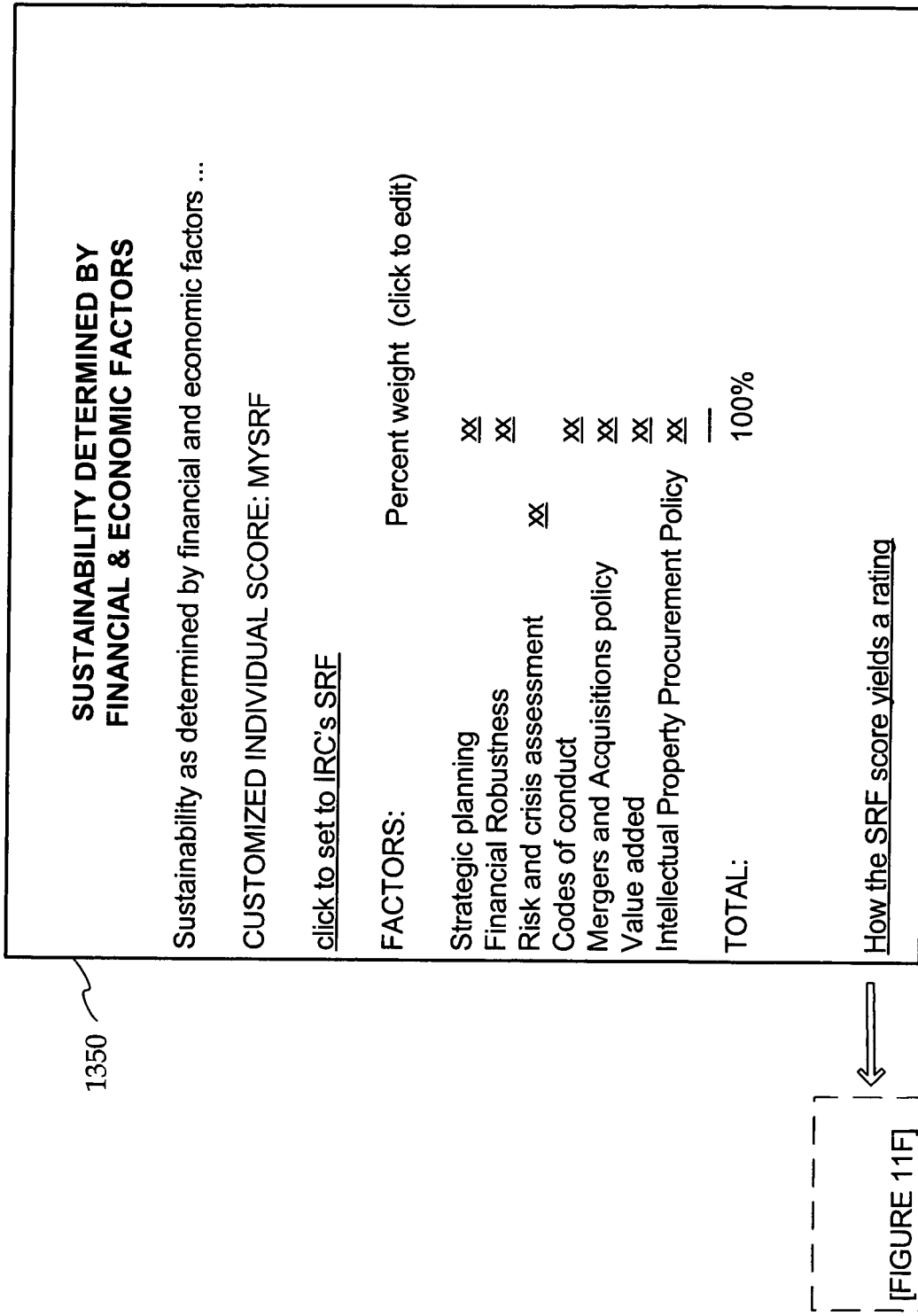

FIG. 13E shows a page 1350 for customizing how an individual financial and economic sustainability score MYSRF is computed. Score MYSRF is computed from factors in the left hand column, as weighted by percentages in the right hand column. Any one of these percentages may be edited by clicking on it.

Figure 13F:
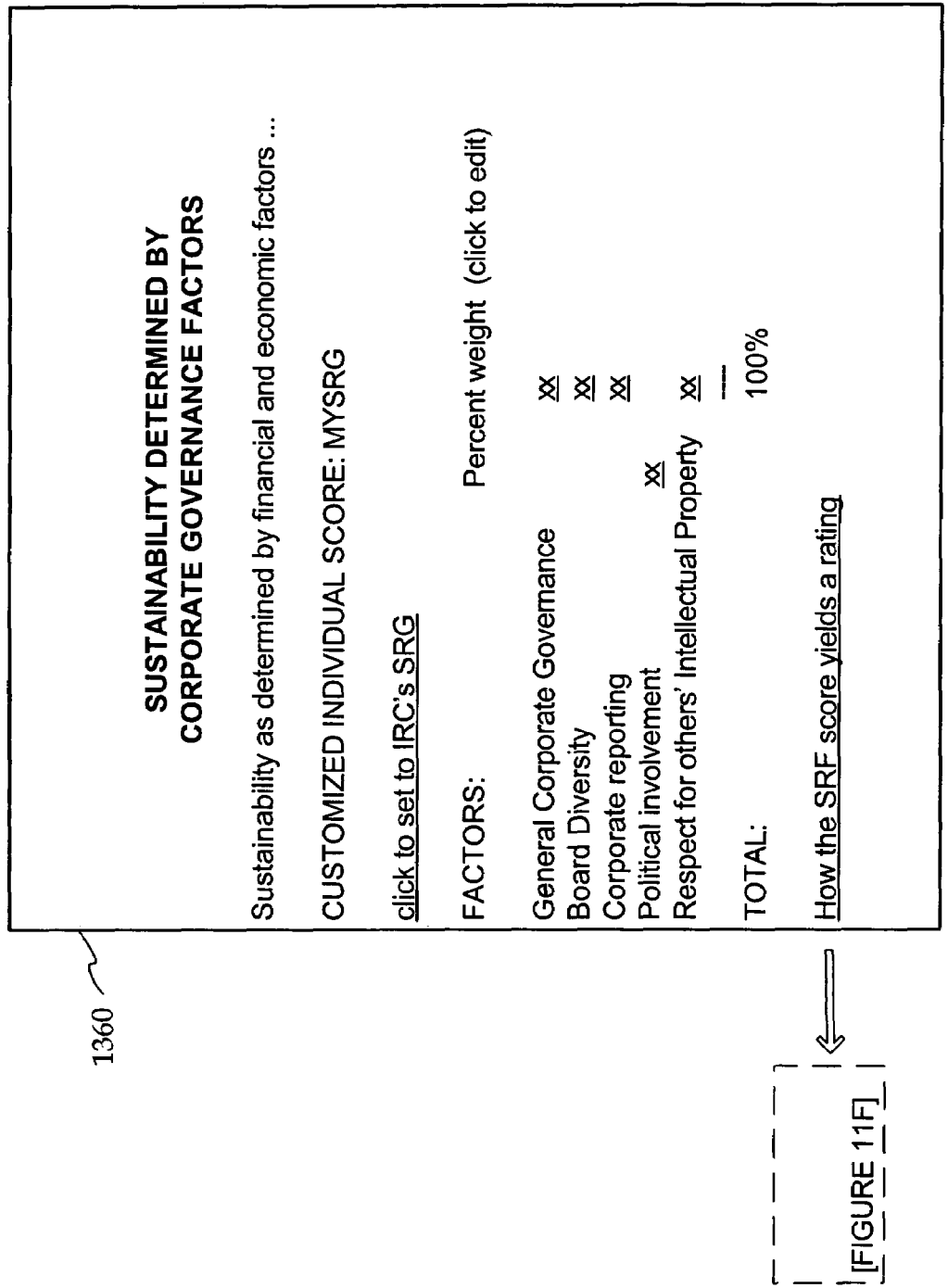

FIG. 13F shows a page 1360 for customizing how an individual corporate governance sustainability score MYSRG is computed. Score MYSRG is computed from factors in the left hand column, as weighted by percentages in the right hand column. Any one of these percentages may be edited by clicking on it.

Figure 14A:
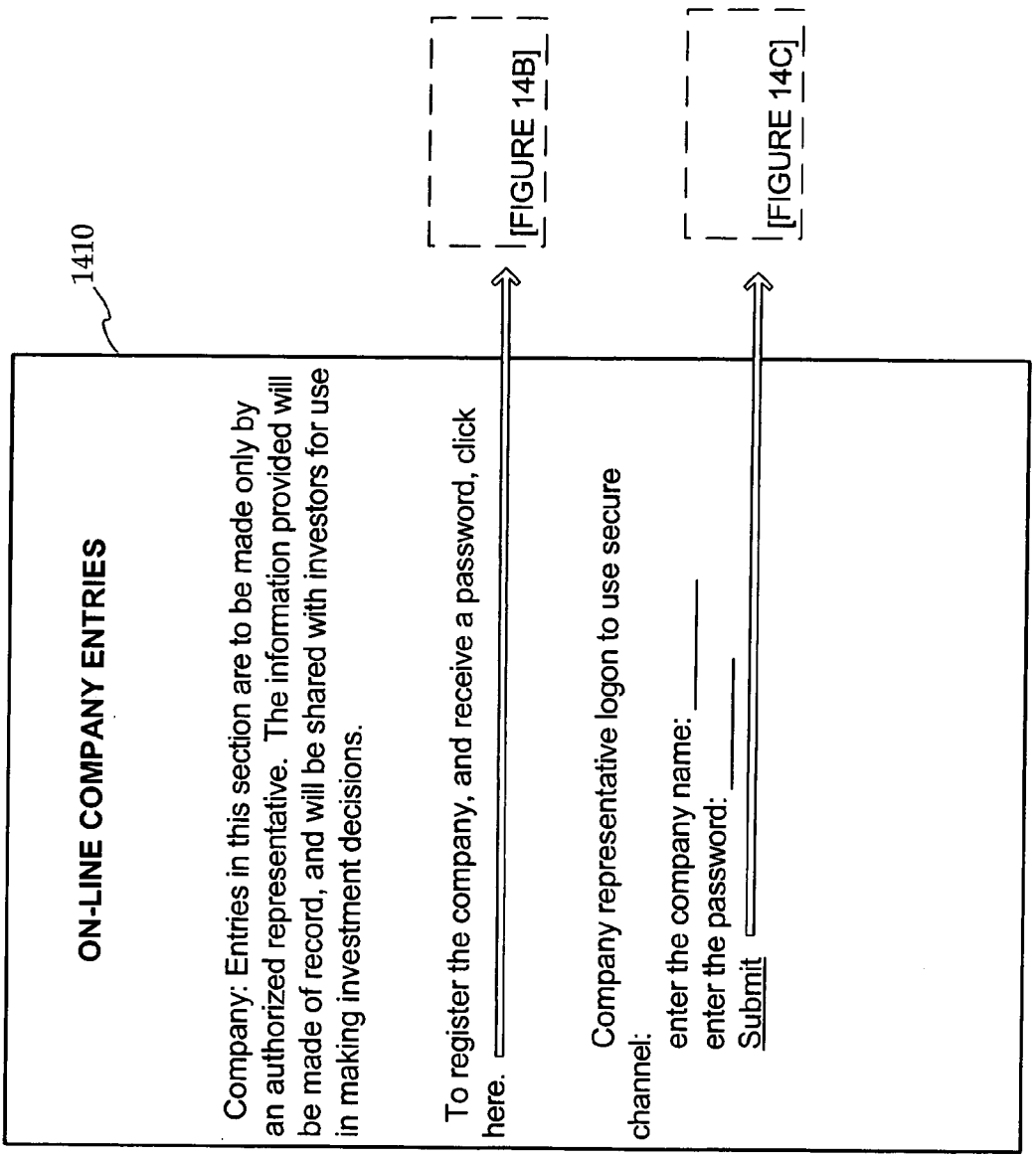

Returning to FIG. 10A, a company representative may be transported from page 1010 to page 1410 of FIG. 14A, which is located in the entity private space 954 of FIG. 9. Page 1410 is a welcome page, which permits various actions to be taken by an authorized representative of the company.

Figure 14C:
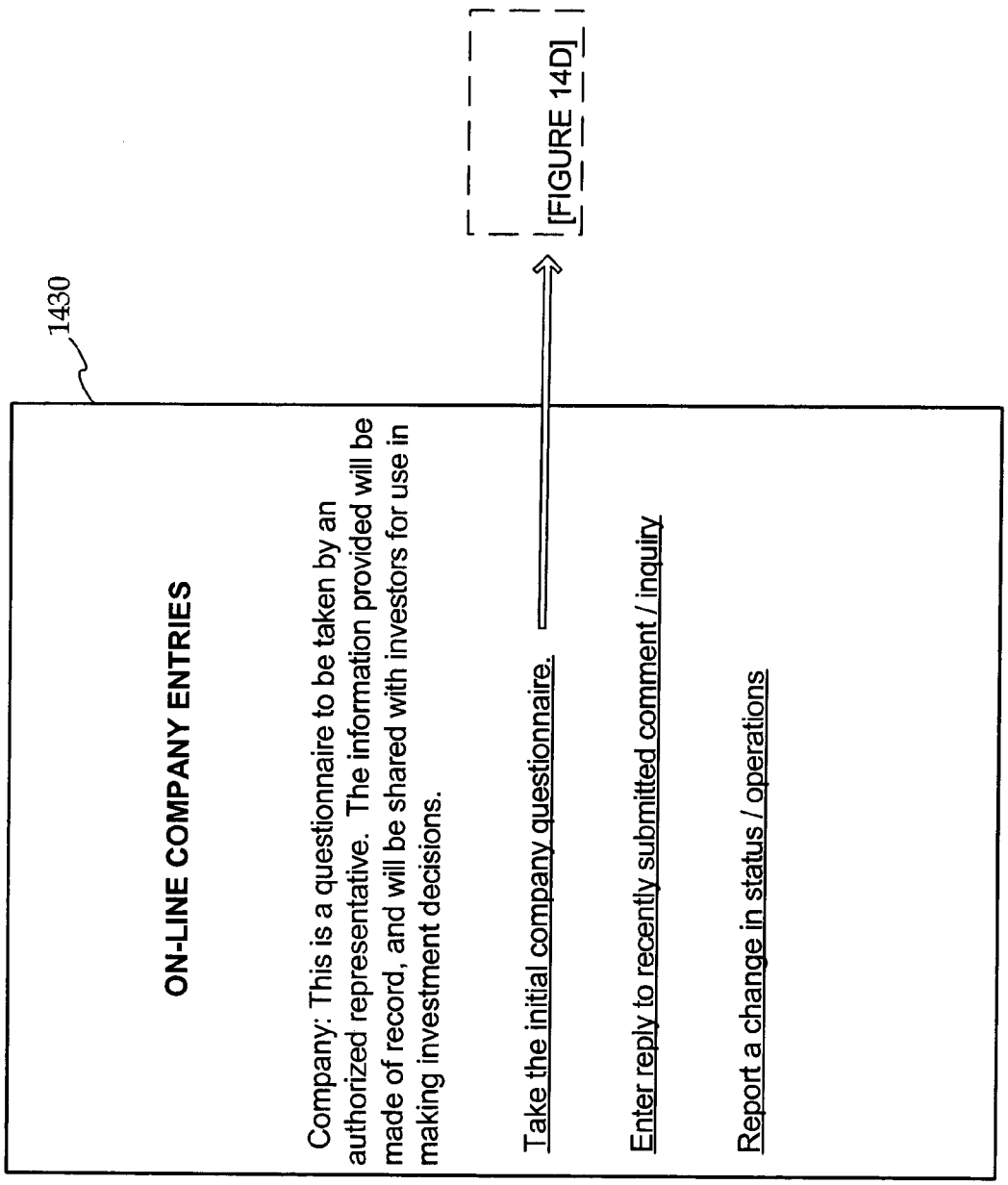

FIG. 14B shows a page 1420 for permitting a company to register on-line. Information about the company is entered and confirmed. FIG. 14C shows page 1430 that can be a starting page once a secure channel has been created. Page 1430 can be used to complete an on-line questionnaire. The questionnaire may be responded to a first time, and then again with later data. FIG. 14D shows a page 1440 that shows such an on-line questionnaire. In one embodiment, the questionnaire has multiple choice questions, the answers to which are scored numerically according to importance.

The above examples operate similarly where the data concerns non-economic factors for one or more governments. Social factors may be measured in terms of compliance with human rights edicts by the United Nations and other international organizations. Environmental factors may be policies regarding pollution, and so on. Governance factors may be measured in terms of access to the political process by common people, corruption, and so on. Similarly, then, the interface of the invention enables the user to select one of the governments, and computing uses the data concerning the selected government.

It should be understood that data provided through the questionnaire or the secure reporting channel is preferably stored in the repository 720. In addition, the repository 720 or other data store can include data culled from various other reliable sources such as electronic news, information feeds, and periodic or intermittent data pulls from public sources (e.g., television, printed media, Web pages hosted by companies, industries, trade organizations, or government bodies).

It can be appreciated that while the foregoing discussion has concerned the rating of companies and industries, a similar scoring can be made on a product level. Thus, if suitable data were gathered and maintained in the data repository 720 to permit an assessment of the environmental, social, economic, and/or governance impact of manufacturing particular products, say, soft drinks, then a sustainability rating can be made on the basis of one product verses another. Thus, in this example, popular sodas can be compared from a level of corporate responsibility rather than on taste or price, two conventional comparison bases.

Ratings can also concern key individuals such as senior executives at a company. In this variation, suitable data is gathered and maintained in the data repository 720 to permit an assessment of these individuals, including possibly past performance and accomplishments, awards, information on positions of trust and governance, and so on.

In a further embodiment of the invention, trading house subscribers can launch derivative products having a pricing that is regularly updated using data provided by the IRC through the foregoing networked system. The derivative product can be an index comprised of a selection of companies that satisfy prescribed rating or other criteria. The data for companies included in the index can be processed using weighting and coefficient values selected by the trading house, as described above, to provide a sustainability product that is priced in accordance with that trading house's perspective on the companies that are included in that derivative product. Numerous details have been set forth in this description, which is to be taken as a whole, to provide a more thorough understanding of the invention. In other instances, well-known features have not been described in detail, so as to not obscure unnecessarily the invention.

While disclosed in the preferred form, the specific embodiments of the invention as disclosed herein and illustrated in the drawings are not to be considered in a limiting sense. Rather, these embodiments are provided so that this disclosure will be thorough and complete, and will fully convey the scope of the invention to those skilled in the art. Indeed, it should be readily apparent in view of the present description that the invention may be modified in numerous ways. Among other things, the present invention may be embodied as devices, methods, software, and so on. Accordingly, the present invention may take the form of an entirely hardware embodiment, an entirely software embodiment or an embodiment combining software and hardware aspects. The following detailed description is, therefore, not to be taken in a limiting sense.

The invention includes combinations and subcombinations of the various elements, features, functions and/or properties disclosed herein. The following claims define certain combinations and subcombinations, which are regarded as novel and non-obvious. Additional claims for other combinations and subcombinations of features, functions, elements and/or properties may be presented in this or a related document.

The invention claimed is:

1. In a computer-implemented rating system having access to a database populated with data concerning at least one non-economic factor for a company, a method comprising:
   providing an interface for displaying at least a portion of the data;
   enabling a user to input at least one coefficient value and an alert-input through the interface, the alert-input including at least one monitored holding and a personalized criteria concerning a sustainability score of the monitored holding;
   associating each said coefficient value with a respective data concerning the at least one non-economic factor;
   computing a sustainability score using the at least one coefficient value and the data, the sustainability score utilizing the at least one non-economic factor in a formula that applies the associated coefficient value to the respective data concerning the at least one non-economic factor;
   monitoring the at least one monitored holding;
   testing the computed sustainability score against the personalized criteria for each monitored holding;
   permitting the user to view the formula through the interface;

outputting the sustainability score, the sustainability score defining a rating of the company which incorporates the at least one non-economic factor;

generating an alert for each of the monitored holdings that satisfies the personalized criteria; and transmitting the alert to the user in response to satisfaction of the personalized criteria.

2. The method of claim 1, further comprising:
storing the user-input coefficient value in an account associated with the user.

3. The method of claim 1, wherein
the sustainability score includes a plurality of individual scores corresponding to discrete sustainability criteria.

4. The method of claim 3, wherein
the coefficient value is used to compute at least one of the individual scores.

5. The method of claim 3, wherein
the sustainability score is computed by combining at least two of the individual scores, and
the coefficient value is used to affect how the individual scores are combined.

6. The method of claim 3, wherein
the discrete sustainability criteria include at least one of a social responsibility rating, an environmental responsibility rating, and a corporate governance rating.

7. The method of claim 6, wherein
the discrete sustainability criteria further include an economic rating.

8. The method of claim 1, further comprising:
benchmarking the sustainability score against a reference score.

9. In a computer-implemented rating system having access to a database populated with data concerning at least one non-economic factor for multiple companies, each company belonging to an industry, a method comprising:
providing an interface for displaying at least a portion of the data and enabling a user to select at least one of the industry and a company within the industry;
accepting at least one user-input coefficient value and an alert-input through the interface, the alert-input including at least one monitored holding and a personalized criteria concerning a sustainability score of the monitored holding;
associating each said coefficient value with a respective data concerning the at least one non-economic factor for a company;
computing a sustainability score using at least one said coefficient value and the data concerning the selected one of the companies, the sustainability score utilizing the at least one non-economic factor in a formula that is viewable by the user through the interface;
monitoring the at least one monitored holding;
testing the computed sustainability score against the personalized criteria for each monitored holding;
outputting the sustainability score, the sustainability score defining a rating of the industry or company within the industry incorporating the at least one non-economic factor;
generating an alert for each of the monitored holdings that satisfies the personalized criteria; and
transmitting the alert to the user in response to satisfaction of the personalized criteria.

10. The method of claim 9, wherein
the sustainability score for an industry is computed from data concerning non-economic factors of companies in the industry.

11. The method of claim 9, further comprising:
subsequently receiving later data concerning at least one non-economic factor for a company; and
computing a subsequent sustainability score for the company using the later data.

12. The method of claim 11, further comprising:
waiting to receive a verification flag respecting the later data prior to computing the subsequent sustainability score.

13. The method of claim 11, wherein
the later data is received from at least one of the public and the company.

14. The method of claim 11, wherein the data concerns non-economic factors for multiple companies, the method further comprising:
defining a derivative index product comprising a selection of companies among the multiple companies,
pricing the derivative product; and
offering the derivative product for purchase and sale in a public market.

15. The method of claim 14, wherein
the later data is received as a response to a questionnaire.

16. The method of claim 14, further comprising:
establishing a secure entity reporting channel, and
wherein the later data is received over the channel.

17. The method of claim 9, wherein the personalized criteria includes at least one user-input coefficient associated with a respective non-economic factor used to compute a threshold sustainability score.

18. The method of claim 9, wherein the monitored holding includes companies in which the user has an investment.

19. The method of claim 18 further comprising the steps of:
subscribing to the client service;
authenticating the user as a subscriber, wherein the steps of receiving the alert-input, generating the alert, and transmitting the alert are performed after successful authentication of the user.

20. A computer for implementing a rating system, the computer having access to a database populated with data concerning at least one non-economic factor for a company, the computer comprising:
means for displaying at least a portion of the data and a formula that generates a sustainability score;
means for enabling a user to input at least one coefficient value and an alert-input, the alert-input including at least one monitored holding and a personalized criteria concerning the sustainability score of each of the monitored holdings;
means for associating each user-input coefficient value with a respective non-economic factor;
a processor programmed to compute the sustainability score using the formula, the formula mathematically applying each associated user-input coefficient value to the respective non-economic factor;
means for monitoring the monitored holdings;
means for testing the computed sustainability score against the personalized criteria for each of the monitored holdings;
means for generating an alert for each of the monitored holdings that satisfy the personalized criteria; and
means for transmitting the alert to the user in response to satisfaction of the personalized criteria,
wherein the displaying means outputs the sustainability score, the sustainability score defining a rating of the company incorporating the at least one non-economic factor.

21. The computer of claim 20, further comprising:
means for storing the user-input coefficient value in an account associated with the user.
22. The computer of claim 20, wherein
the sustainability score includes a plurality of individual scores corresponding to discrete sustainability criteria.
23. The computer of claim 22, wherein
the coefficient value is used to compute at least one of the individual scores.
24. The computer of claim 22, wherein
the sustainability score is computed by combining at least two of the individual scores, and
the coefficient value is used to affect how the individual scores are combined.
25. The computer of claim 22, wherein
the discrete sustainability criteria include at least one of a social responsibility rating, an environmental responsibility rating, and a corporate governance rating.
26. The computer of claim 25, wherein
the discrete sustainability criteria further include an economic rating.
27. The computer of claim 20, further comprising:
means for benchmarking the sustainability score against a reference score.
28. A computer for implementing a rating system, the computer having access to a database populated with data concerning at least one non-economic factor for multiple companies, each company belonging to an industry, the computer comprising:
means for displaying at least a portion of the data and a formula that generates a sustainability score;
means for enabling a user to input at least one coefficient value and an alert-input, the alert-input including at least one monitored holding and a personalized criteria concerning the sustainability score of each of the monitored holdings;
means for and associating each user-input coefficient value with a respective non-economic factor;
the means for enabling the user further enables the user to select at least one of the industry and a company within the industry, and
a processor programmed to compute the sustainability score using the formula provided with at least one associated coefficient value and the respective non-economic data concerning the selected industry or company within the industry;
means for monitoring the monitored holdings;
means for testing the computed sustainability score against the personalized criteria for each of the monitored holdings;
means for generating an alert for each of the monitored holdings that satisfy the personalized criteria; and
means for transmitting the alert to the user in response to satisfaction of the personalized criteria,
wherein the displaying means outputs the sustainability score, the sustainability score defining a rating of the company incorporating the at least one non-economic factor.
29. The computer of claim 28, wherein
the sustainability score for an industry is computed from data concerning non-economic factors of companies in the industry.
30. The computer of claim 28, wherein
a plurality of sustainability scores for respective companies is computed and compared.

31. The computer of claim 28, further comprising:
means for subsequently receiving later data concerning at least one non-economic factor for a company; and
means for computing a subsequent sustainability score for the company using the later data.
32. The computer of claim 31, further comprising:
means for waiting to receive a verification flag respecting the later data prior to computing the subsequent sustainability score.
33. The computer of claim 31, wherein
the later data is received from the public.
34. The computer of claim 31, wherein
the later data is received from the company.
35. The computer of claim 31, wherein
the later data is received as a response to a questionnaire.
36. The computer of claim 31, further comprising:
means for establishing a secure entity reporting channel, and
wherein the later data is received over the channel.
37. The method of claim 28, wherein the personalized criteria includes at least one user-input coefficient associated with a respective non-economic factor used to compute a threshold sustainability score.
38. The method of claim 28, wherein the monitored holding includes companies in which the user has an investment.
39. The method of claim 38 further comprising the steps of:
subscribing to the client service;
authenticating the user as a subscriber, wherein the steps of receiving the alert-input, generating the alert, and transmitting the alert are performed after successful authentication of the user.
40. A computer for implementing a rating system, the computer having access to a database populated with data concerning at least one non-economic factor, the computer comprising:
a software interface executing on the computer and programmed to display at least a portion of the data, to enable input of at least one coefficient value and an alert-input, the alert input including a monitored holding and a personalized criteria concerning the sustainability score of the monitored holding, to associate each user-input coefficient value with a respective non-economic factor, and to display a formula useful in computing a sustainability score; and
a processor programmed to compute the sustainability score using the formula in conjunction with any input coefficient values and the data, to monitor the monitored holding, to test the computed sustainability score against the personalized criteria for each of the monitored holdings, to generate an alert indicating that the monitored holding satisfies the personalized criteria, and transmit the alert to the user in response to satisfaction of the personalized criteria,
wherein the interface outputs the sustainability score, the sustainability score defining a rating of the company incorporating the at least one non-economic factor.
41. The computer of claim 40, further comprising:
a memory for storing the input coefficient values in an account associated with the user.
42. The computer of claim 40, wherein
the sustainability score includes a plurality of individual scores corresponding to discrete sustainability criteria.
43. The computer of claim 42, wherein
the coefficient value is used to compute at least one of the individual scores.

44. The computer of claim 42, wherein
the sustainability score is computed by combining at least two of the individual scores, and
the coefficient value is used to affect how the individual scores are combined.

45. The computer of claim 42, wherein
the discrete sustainability criteria include at least one of a social responsibility rating, an environmental responsibility rating, and a corporate governance rating.

46. The computer of claim 45, wherein
the discrete sustainability criteria further include an economic rating.

47. The computer of claim 40, further comprising:
the processor is adapted to further benchmark the sustainability score against a reference score.

48. A computer for implementing a rating system, the computer having access to a database populated with data concerning at least one non-economic factor for multiple companies, each company belonging to an industry, the computer comprising:
    software interface executing on the computer and programmed to display at least a portion of the data, to enable input of at least one coefficient value and an alert-input, the alert input including a monitored holding and a personalized criteria concerning the sustainability score of the monitored holding, to associate each user-input coefficient value with a respective non-economic factor, and to enable the user to select at least one of the industry and a company within the industry, and to display a formula useful in computing a sustainability score; and
    a processor programmed to compute the sustainability score using the formula in conjunction with any input coefficient values and the data concerning the selected industry or company within the industry, to monitor the monitored holdings, to test the computed sustainability score against the personalized criteria for each of the monitored holding, to generate an alert indicating that the monitored holding satisfies the personalized criteria, and transmit the alert to the user in response to satisfaction of the personalized criteria,
    wherein the interface is further programmed to output the sustainability score, the sustainability score defining a rating incorporating the at least one non-economic factor of the selected industry or company within the industry.

49. The computer of claim 48, wherein
the sustainability score for an industry is computed from data concerning non-economic factors of companies in the industry.

50. The computer of claim 48, wherein
a plurality of sustainability scores for respective companies is computed and compared.

51. The computer of claim 48, wherein
the interface is further programmed to receive later data concerning at least one non-economic factor for a company; and
the processor is programmed to further compute a subsequent sustainability score for the company using the later data.

52. The computer of claim 51, wherein
the processor is adapted to further wait to receive a verification flag respecting the later data prior to computing the subsequent sustainability score.

53. The computer of claim 51, wherein
the later data is received from the public.

54. The computer of claim 51, wherein
the later data is received from the company.

55. The computer of claim 54, wherein
the later data is received as a response to a questionnaire.

56. The computer of claim 54, wherein
the interface is adapted to further establish a secure entity reporting channel, and
the later data is received over the channel.

57. The method of claim 48, wherein the personalized criteria includes at least one user-input coefficient associated with a respective non-economic factor used to compute a threshold sustainability score.

58. The method of claim 48, wherein the monitored holding includes companies in which the user has an investment.

59. The method of claim 58 further comprising the steps of:
    subscribing to the client service;
    authenticating the user as a subscriber, wherein the steps of receiving the alert-input, generating the alert, and transmitting the alert are performed after successful authentication of the user.

60. In a computer-implemented rating system having access to a database populated with data concerning at least one non-economic factor, the at least one non-economic factor including at least one of a social factor, an environmental factor, and a corporate governance factor, a method comprising:
    providing a software interface executing on the computer and programmed to display at least a portion of the data;
    enabling a user to input at least one coefficient value and an alert-input through the interface, the alert-input including at least one monitored holding and a personalized criteria concerning the sustainability score of the at least one monitored holding;
    associating each of the at least one user-input coefficient values with the data concerning a respective non-economic factor, each associated user-input coefficient representing a weighting of the respective non-economic factor;
    computing a sustainability score using a formula which mathematically applies each associated user-input coefficient value to the data concerning the respective non-economic factor;
    monitoring the at least one monitored holding;
    testing the computed sustainability score against the personalized criteria for each of the monitored holdings;
    providing the user an interactive control for inspecting through the interface the formula, the data concerning the respective non-economic factor, and the user-input coefficient associated with each respective underlying non-economic factor data concerning each of the at least one non-economic factors;
    outputting the sustainability score, the sustainability score defining a rating of the company which incorporates the at least one non-economic factor;
    generating an alert indicating that the monitored holding satisfies the personalized criteria; and
    transmitting the alert to the user in response to satisfaction of the personalized criteria.

61. The method of claim 60, wherein the personalized criteria includes at least one user-input coefficient associated with a respective non-economic factor used to compute a threshold sustainability score.

62. The method of claim 60, wherein the monitored holding includes companies in which the user has an investment.

63. The method of claim 62 further comprising the steps of:
 subscribing to the client service;
 authenticating the user as a subscriber, wherein the steps of receiving the alert-input, generating the alert, and transmitting the alert are performed after successful authentication of the user.

\* \* \* \* \*